US012592113B2

(12) United States Patent
Beskitt et al.

(10) Patent No.: US 12,592,113 B2
(45) Date of Patent: Mar. 31, 2026

(54) DUAL CASSETTE

(71) Applicant: Diebold Nixdorf, Incorporated, Hudson, OH (US)

(72) Inventors: William Beskitt, Canton, OH (US); Sascha Groepper, Geseke (DE); Sean Haney, North Canton, OH (US); Alexander Uhl, Paderborn (DE)

(73) Assignee: Diebold Nixdorf, Incorporated, North Canton, OH (US)

(*) Notice: Subject to any disclaimer, the term of this patent is extended or adjusted under 35 U.S.C. 154(b) by 519 days.

(21) Appl. No.: 17/861,777

(22) Filed: Jul. 11, 2022

(65) Prior Publication Data

US 2024/0013604 A1 Jan. 11, 2024

(51) Int. Cl.
*G07D 11/13* (2019.01)
*G07F 19/00* (2006.01)

(52) U.S. Cl.
CPC ........... *G07D 11/13* (2019.01); *G07F 19/201* (2013.01)

(58) Field of Classification Search
None
See application file for complete search history.

(56) References Cited

U.S. PATENT DOCUMENTS 6,220,540 B1 4/2001 Shimbo
7,497,436 B2 3/2009 Tocher
7,870,996 B1 1/2011 Graef
9,070,241 B2 * 6/2015 Fujita ........................ B65H 1/14
2016/0371911 A1 12/2016 Jones

FOREIGN PATENT DOCUMENTS

WO WO-2020264147 A1 * 12/2020 ............. B65H 1/266

OTHER PUBLICATIONS

International Search Report filed in corresponding PCT Application dated Nov. 11, 2022; 4 pages.
Written Opinion filed in corresponding PCT Application dated Nov. 11, 2022; 9 pages.
International Preliminary Report on Patentability filed in corresponding PCT Application dated Dec. 18, 2024; 10 pages.

* cited by examiner

*Primary Examiner* — Thien M Le
*Assistant Examiner* — April A Taylor
(74) *Attorney, Agent, or Firm* — Black McCuskey

(57) ABSTRACT

In example embodiments described herein are various features for a dual cassette. In one embodiment, a push plate catch and release mechanism is employed that can prevent movement of the push plate when movement of the push plate is not being caused by a motor. In another example embodiment, there is described herein an adjustable rail system for a cassette where the rails are configured so that the rails are installed in the correct bracket and in the correct orientation. In yet another example embodiment, there is disclosed herein a multi-compartment cassette with a transport access door. The transport access door provides access to an internal transport of the cassette without providing access to the contents of the cassette.

14 Claims, 39 Drawing Sheets

DUAL CASSETTE

TECHNICAL FIELD

The present disclosure relates generally to cassettes for holding sheets, such as cassettes employed by automated banking machines.

BACKGROUND

Automated banking machines, such as for example, an Automated Transaction Machine ("ATM") provide the ability to perform a variety of self-service transactions. Types of transactions that can be performed on an ATM include financial transactions, such as deposits and withdrawal. ATMs may also perform a variety of other transactions, including the sale and purchase of tickets, issuance of coupons, check or voucher presentation, the printing of script and a variety of other functions.

Automated Transaction Machines often include one or more cassettes for the storage of documents, either to be dispensed, having been deposited, or both such as as with recycling cassettes. An ATM may contain a plurality of cassettes and this may include a variety of different cassettes, such as for different denominations of currency notes or other notes of value, checks, or other suitable items.

SUMMARY OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a catch and release mechanism that can be employed for locking a push plate in a cassette. The catch and release mechanism comprises two gears which interact with a stop. When a force is applied to the first gear to move in a first direction, the first and second gears can move independently to position the release where the release guides the stop around the catch and allows rotation to continue. When a force is applied on the second gear is causing the catch and release mechanism to move in the first direction, the gears can move independently to move (position) the release where the stop will engage the catch, preventing further movement of the push plate.

In accordance with an example embodiment, there is disclosed herein a cassette with a compartment for holding sheets, such as for example currency that comprises a body with a compartment and a front door. The brackets and rails in the compartment have unique shapes and are configured to ensure that the rails are installed in predefined positions. The brackets in the compartment further comprise pockets that provide for adjusting the width between the rails in the compartment. The front door comprises a bracket assembly that fits within the compartment when the front door is closed. The front door's brackets and rails have unique shapes and are also configured to ensure the front door's rails are installed in the proper position. The front door brackets further comprise pockets that provide for adjusting the height of the front door rails In accordance with an example embodiment, there is disclosed herein a multi-compartment cassette with a transport access door. The transport access door provides access to an internal transport of the cassette without providing access to the contents of the cassette.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
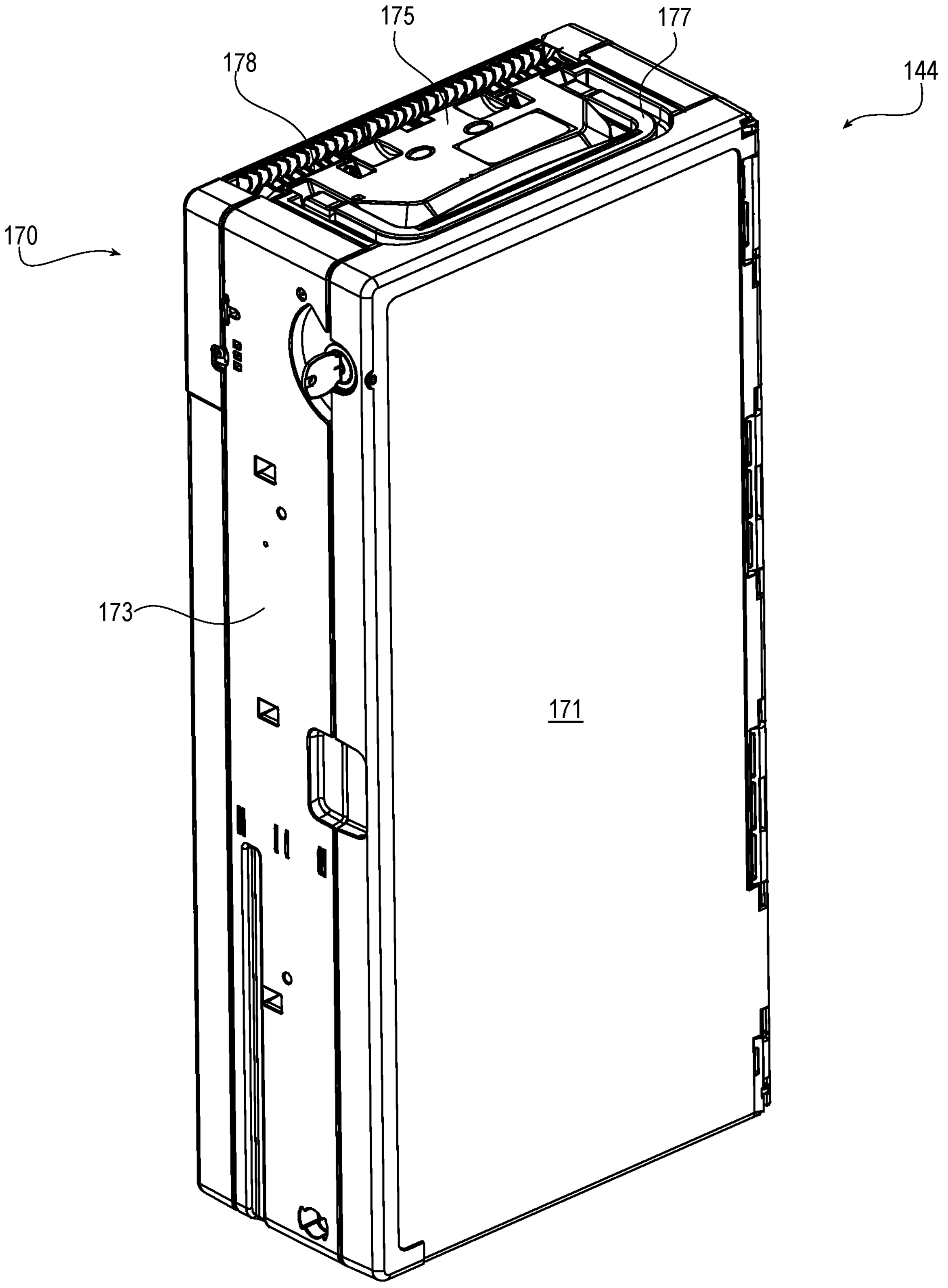
FIG. 1 is a top left perspective view of a first embodiment of a cassette upon which an example embodiment described herein is implemented.
Figure 2:
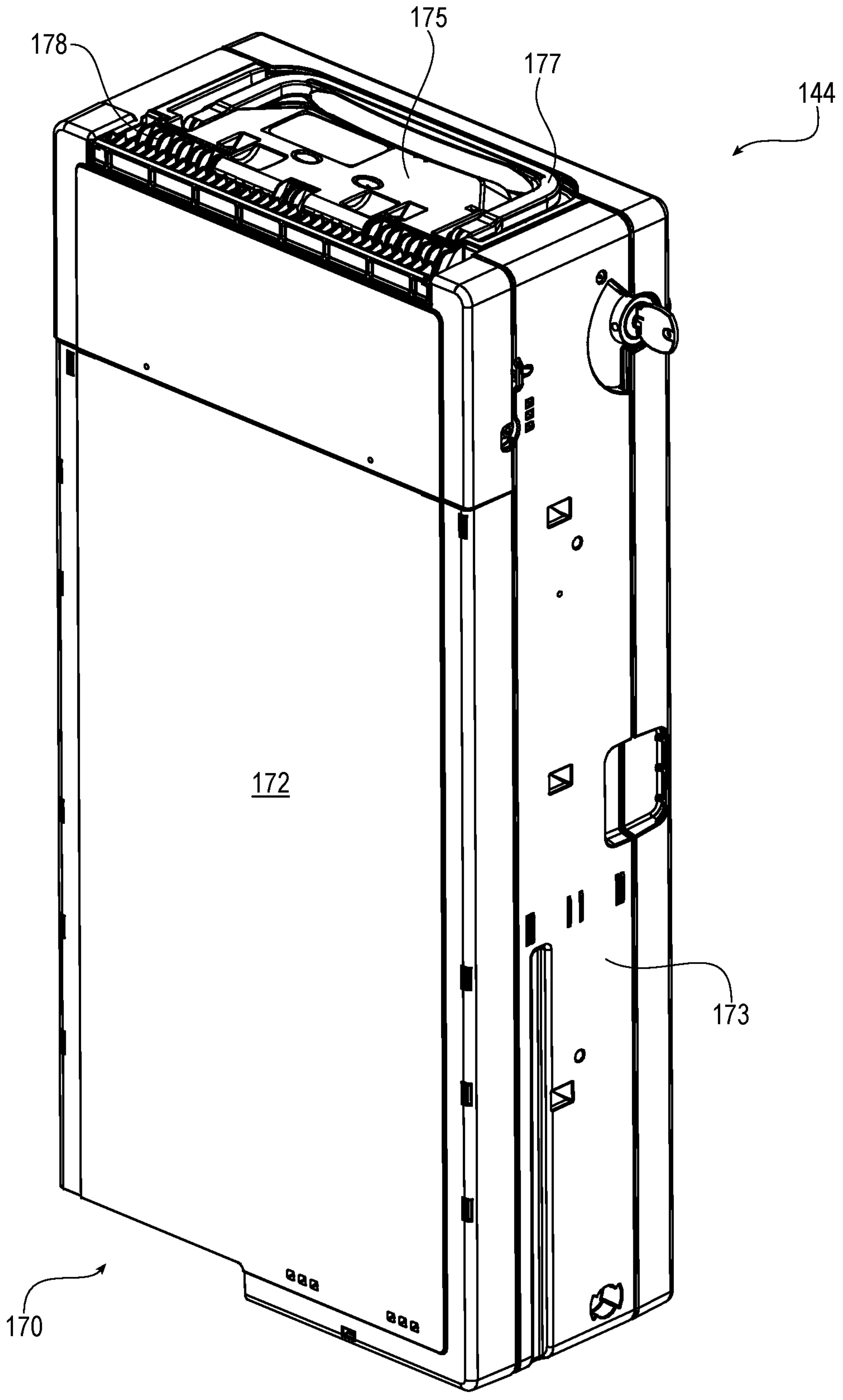
FIG. 2 is a rear left perspective view of the cassette of FIG. 1.
Figure 3:
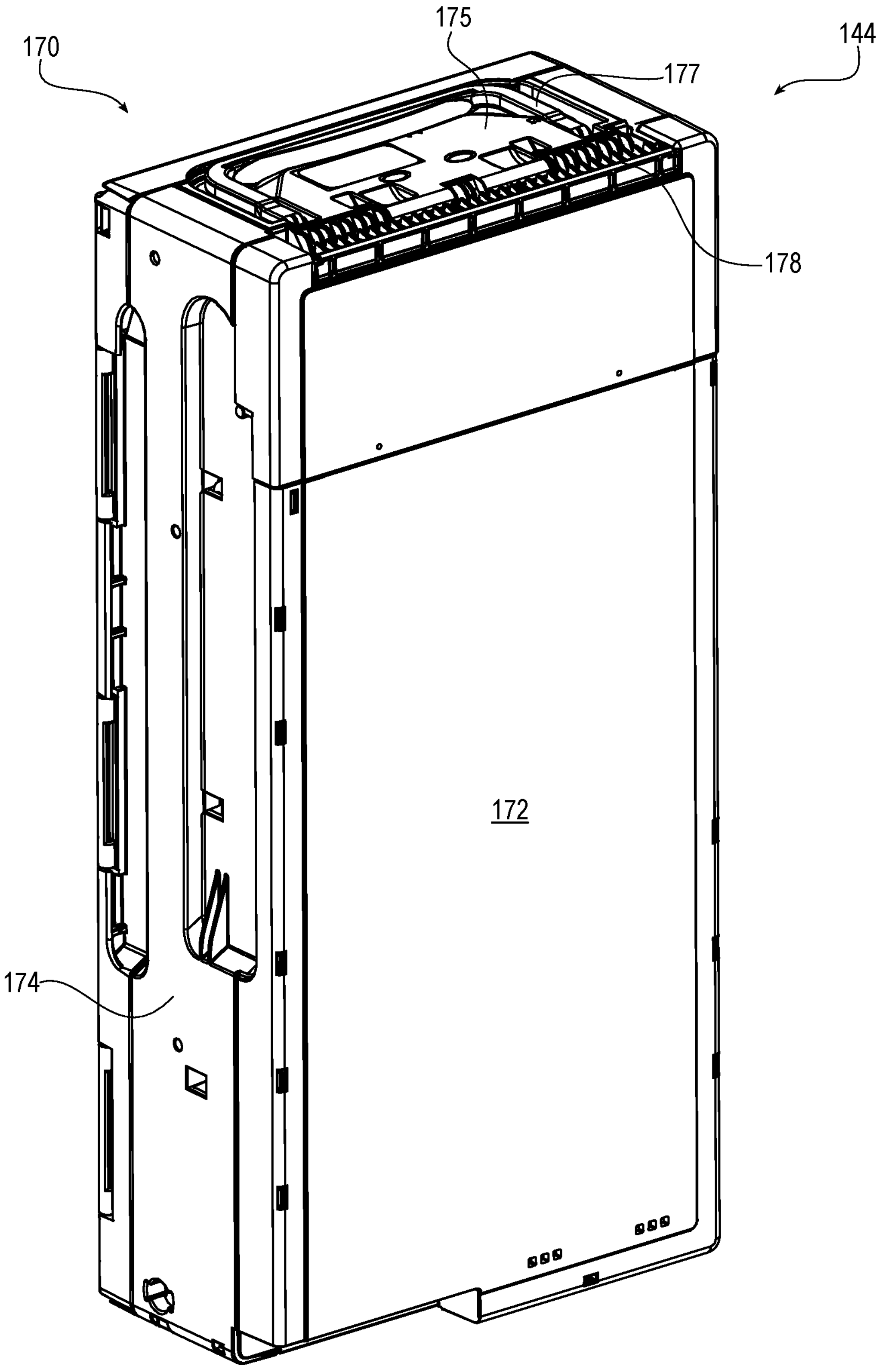
FIG. 3 is a rear right perspective view of the cassette of FIG. 1.
Figure 4:
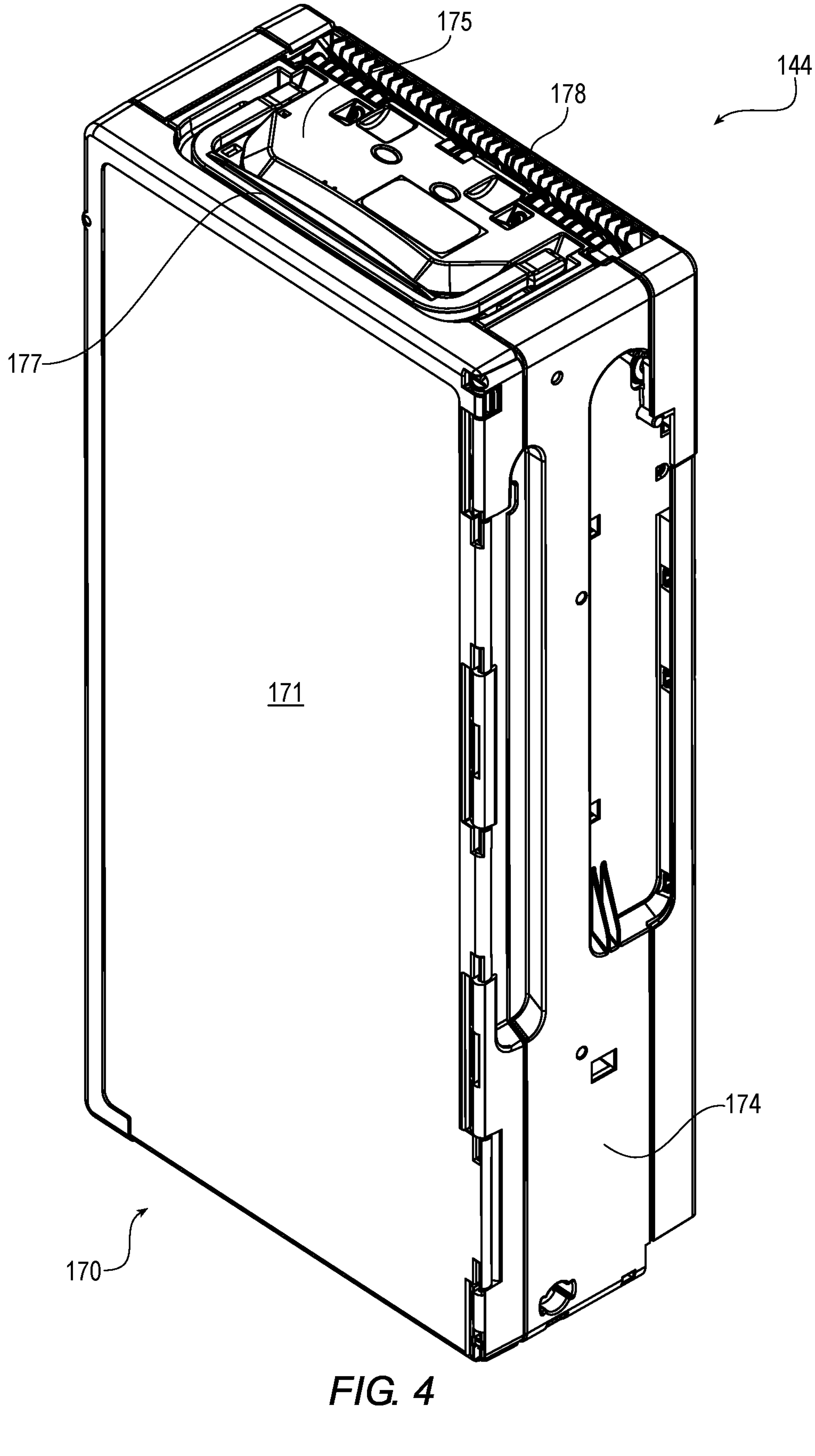
FIG. 4 is a front right perspective view of the cassette of FIG. 1.
Figure 5:
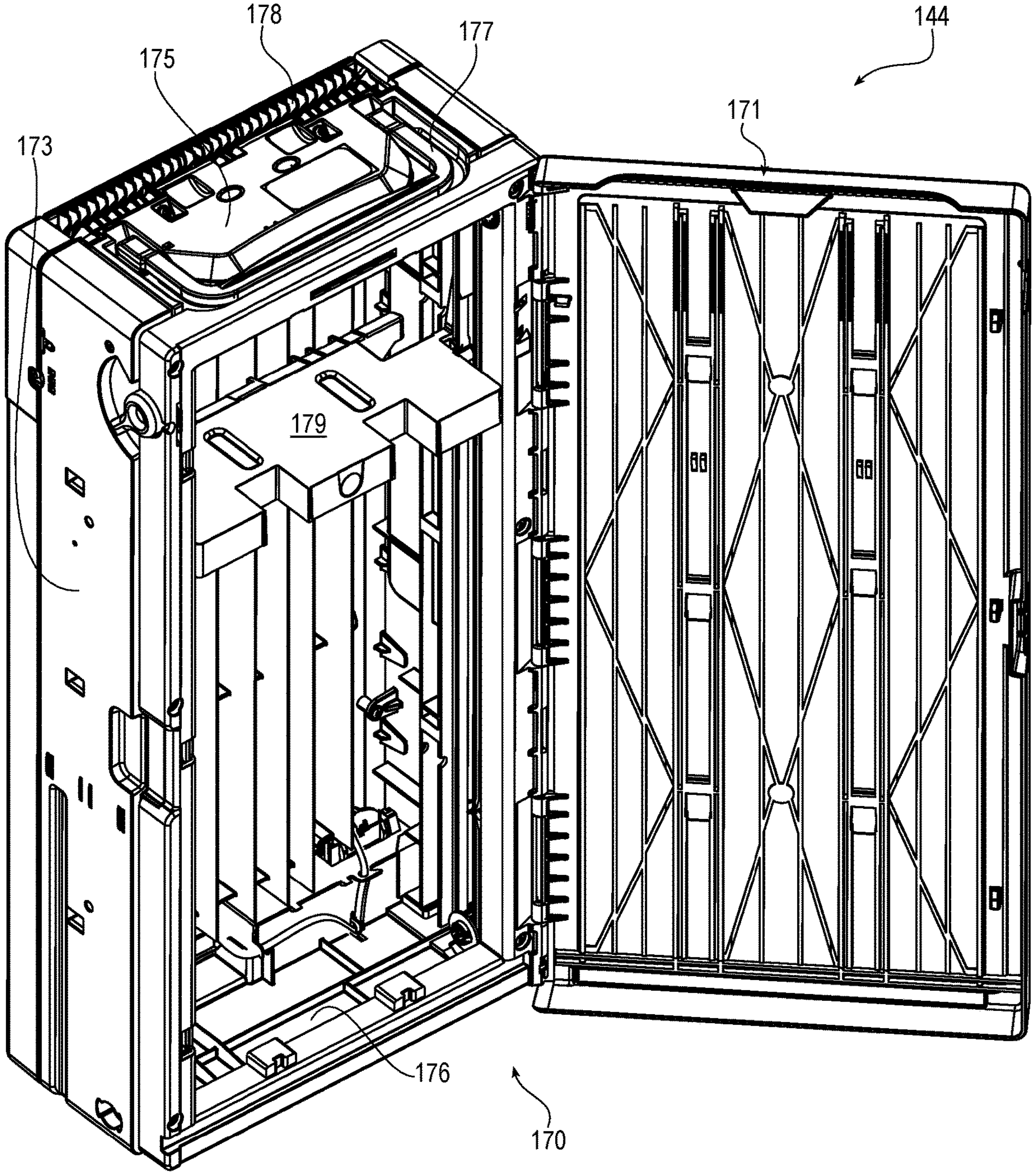
FIG. 5 is a view similar to FIG. 1 except showing the cassette with the front door in an open position.
Figure 6:
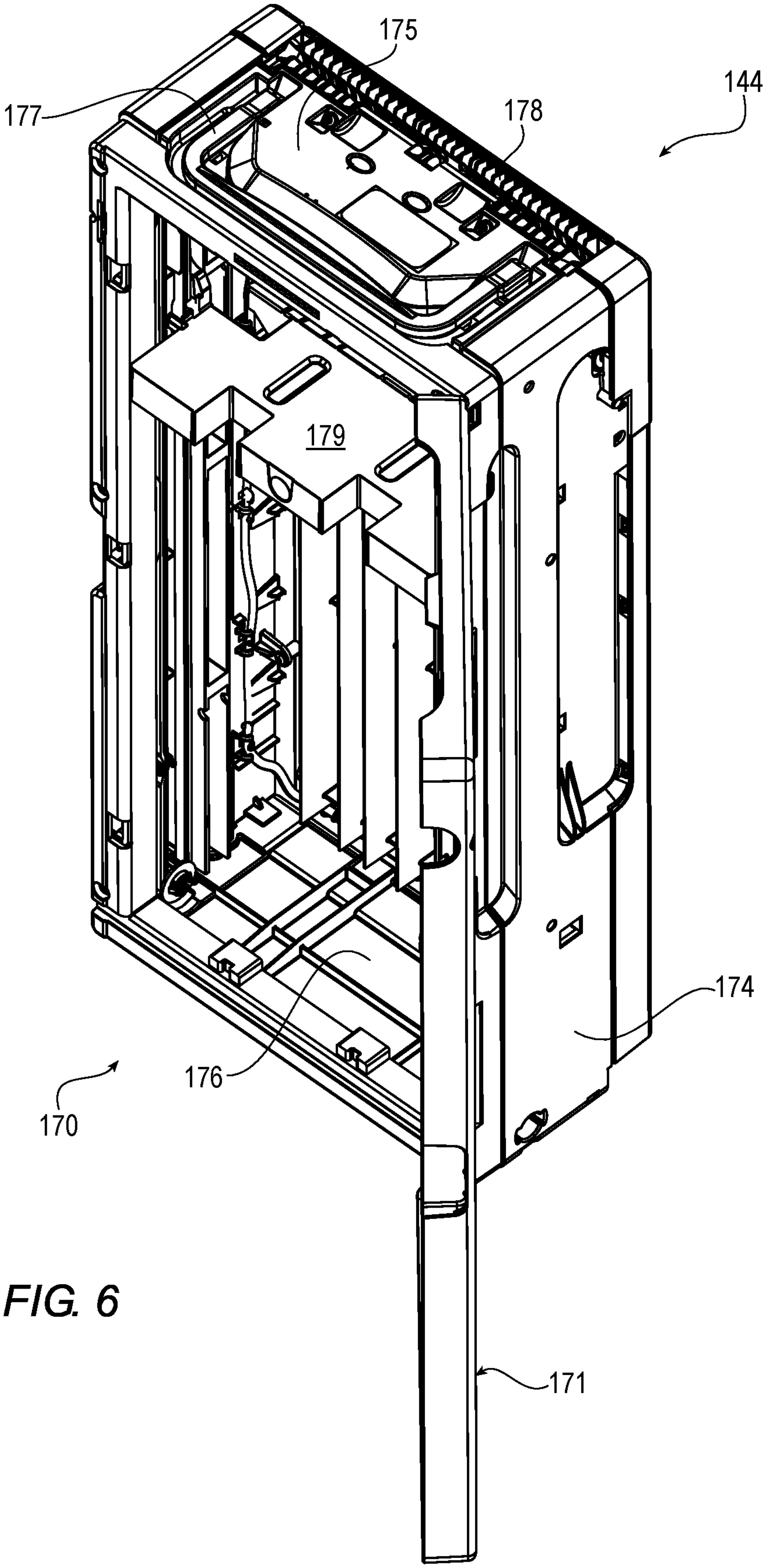
FIG. 6 is a view similar to FIG. 5 that illustrates a different perspective view of the cassette with the front door in an open position.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIGS. 1-7 illustrate a first embodiment of a cassette 144 for use an ATM (not shown) upon which an example embodiment can be implemented. The cassette 144 has an outer shell 170 that comprises a front 171, a rear 172, a left side 173, a right side 174, a top end 175 and a bottom end 176. The cassette 144 is operable to both dispense or accept notes or other documents. Thus, the cassette 144 may be referred to and an In-Out Cassette, a Recycling Cassette, or a Two-Way Cassette.

The top end 175 includes an optional handle 177 and there is a slot 178 formed in the top end 175 to provide for the passage of notes or other documents between the inside and outside of the cassette 144.

The cassette 144 defines an internal cavity for the storage of notes or other documents. A push plate 179 for urging the documents toward the slot 178 is disposed in the cavity. The push plate 179 may be spring biased, motorized, or both. In this embodiment, the front 171 is a hinged front door to provide access to the internal cavity.

Figure 7:
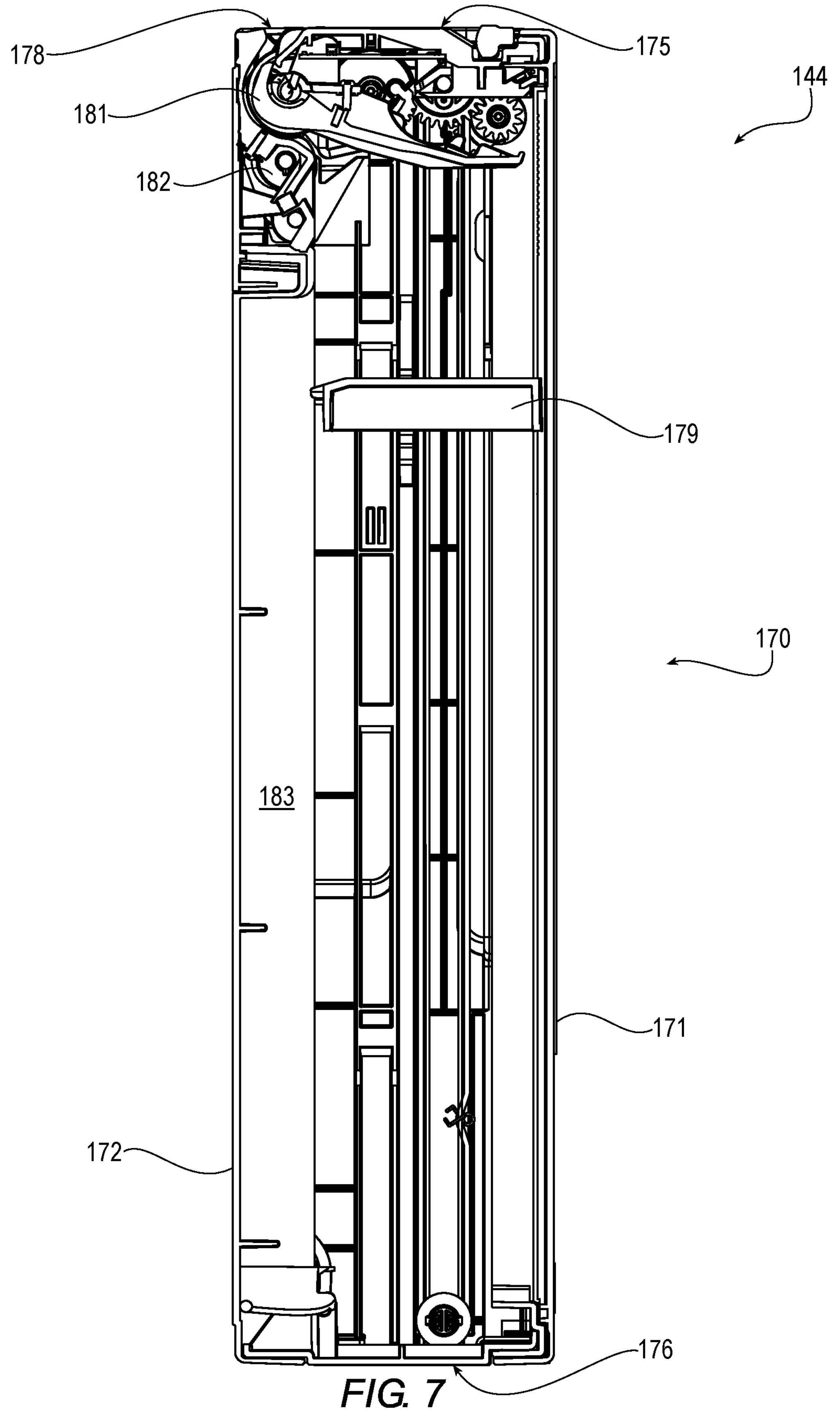
FIG. 7 is a left cross-sectional view of the cassette of FIG. 1.
Figure 8:
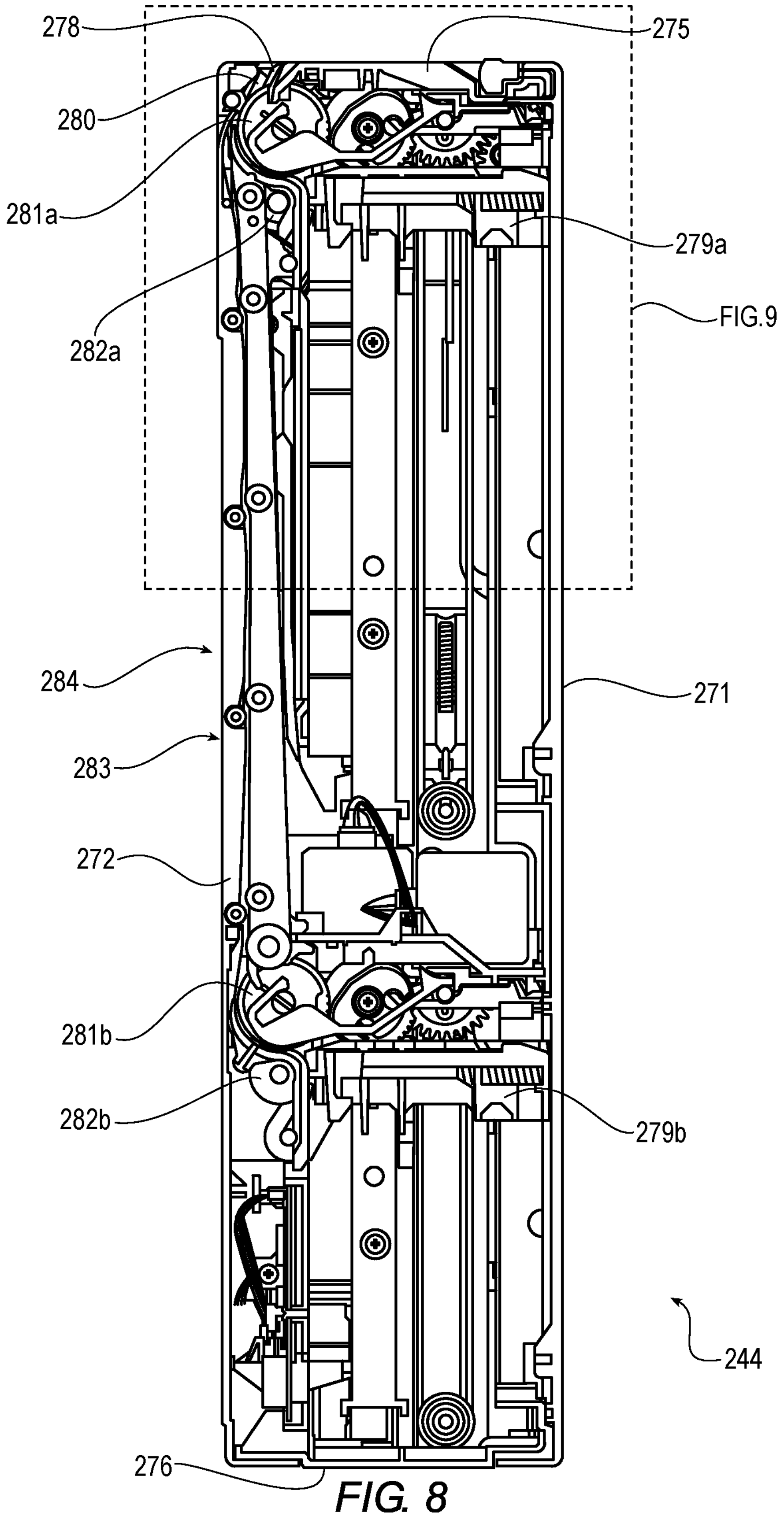
FIG. 8 is a left cross-sectional view illustrating a second embodiment of a cassette that comprises two compartments upon which an example embodiment can be implemented.
Figure 9:
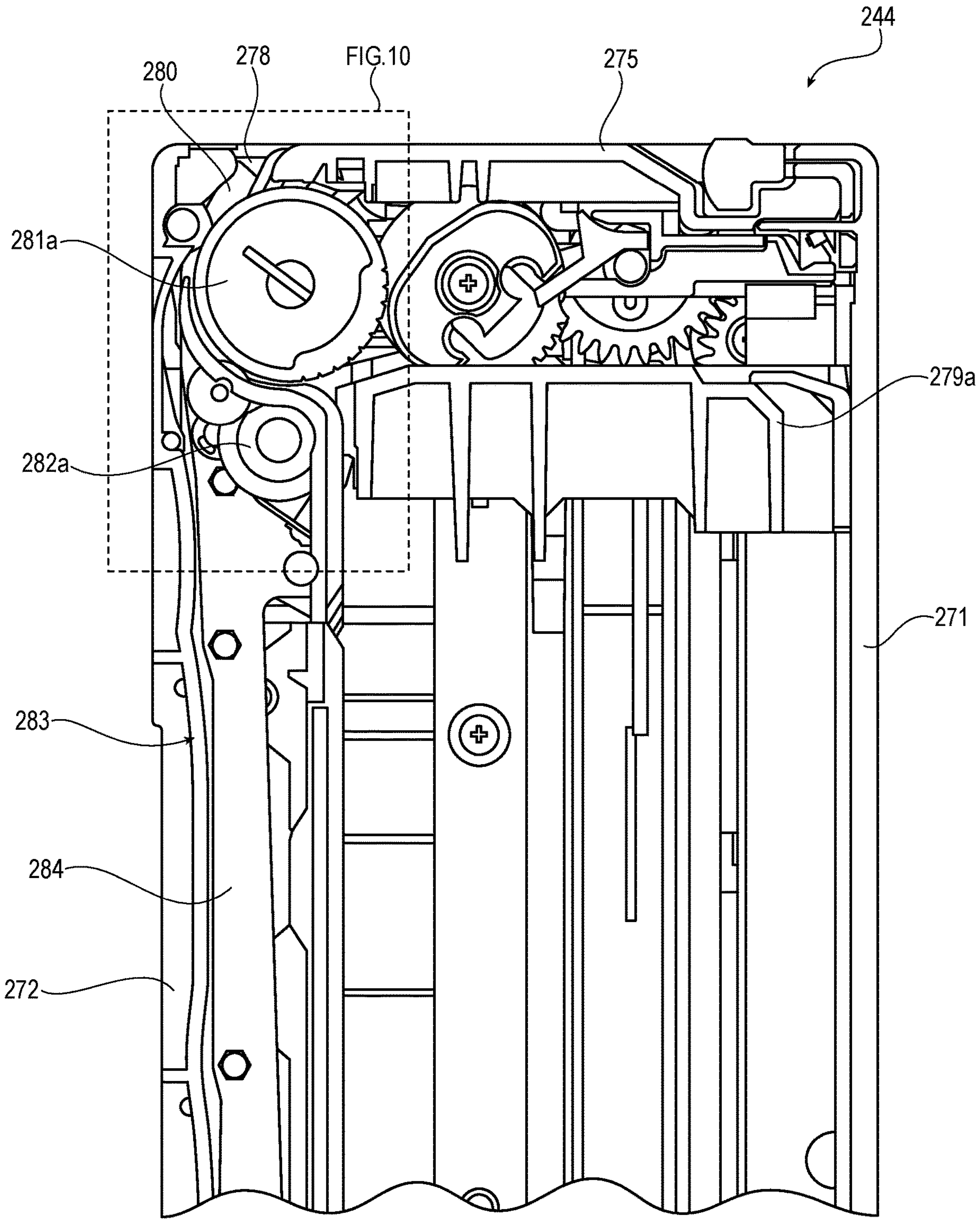
FIG. 9 is an enlarged portion of FIG. 8.

A pathway for the notes or documents to traverse between the cavity and the slot 178 includes a throat 180, a feed wheel 181, and a stripper wheel 182 among other components shown in FIG. 7.

FIGS. 8-12 illustrate a second embodiment of a cassette 244 for use in an ATM upon which an example embodiment described can be implemented. The cassette 244 of the second embodiment has an exterior generally similar to the exterior of the cassette 144 of the first embodiment as illustrated in FIGS. 1-7. In any case. The cassettes 144 and 244 are both configured to be disposed in the core module and operate with an ATM.

The cassette 244 defines two separate internal cavities, an upper cavity, and a lower cavity. A first push plate **279*a* is disposed in the upper cavity and a second push plate 279*b* is disposed in the lower cavity. The push plates 279*a* and 279*b* are operable to urge notes or other documents disposed in the cavities toward a slot 278. The push plates 279*a* and 279*b* may be spring biased, motorized, or both. In this embodiment, the front 271** is a hinged front door to provide access to the upper and lower cavities.

There is an internal transport 284 disposed in a space 283 formed between a rear 272 and a floor of the upper cavity. The internal transport 284 is capable of transporting notes or other documents between an upper end 275 and towards a lower end 276 of the cassette 244.

At an upper end of the internal transport 284 is an upper pathway for the notes or documents to traverse between the cavity and the slot 278. The upper pathway includes an upper feed wheel **281*a*, and an upper stripper wheel 282*a* among other components shown in FIGS. 8 and 9**.

At a lower end of the internal transport 284 is a lower pathway for the notes or documents to traverse between the lower cavity and the slot 278. The lower pathway includes a lower feed wheel **281*b*, and a lower stripper wheel 282*b* among other components shown in FIG. 8**.

Figure 10:
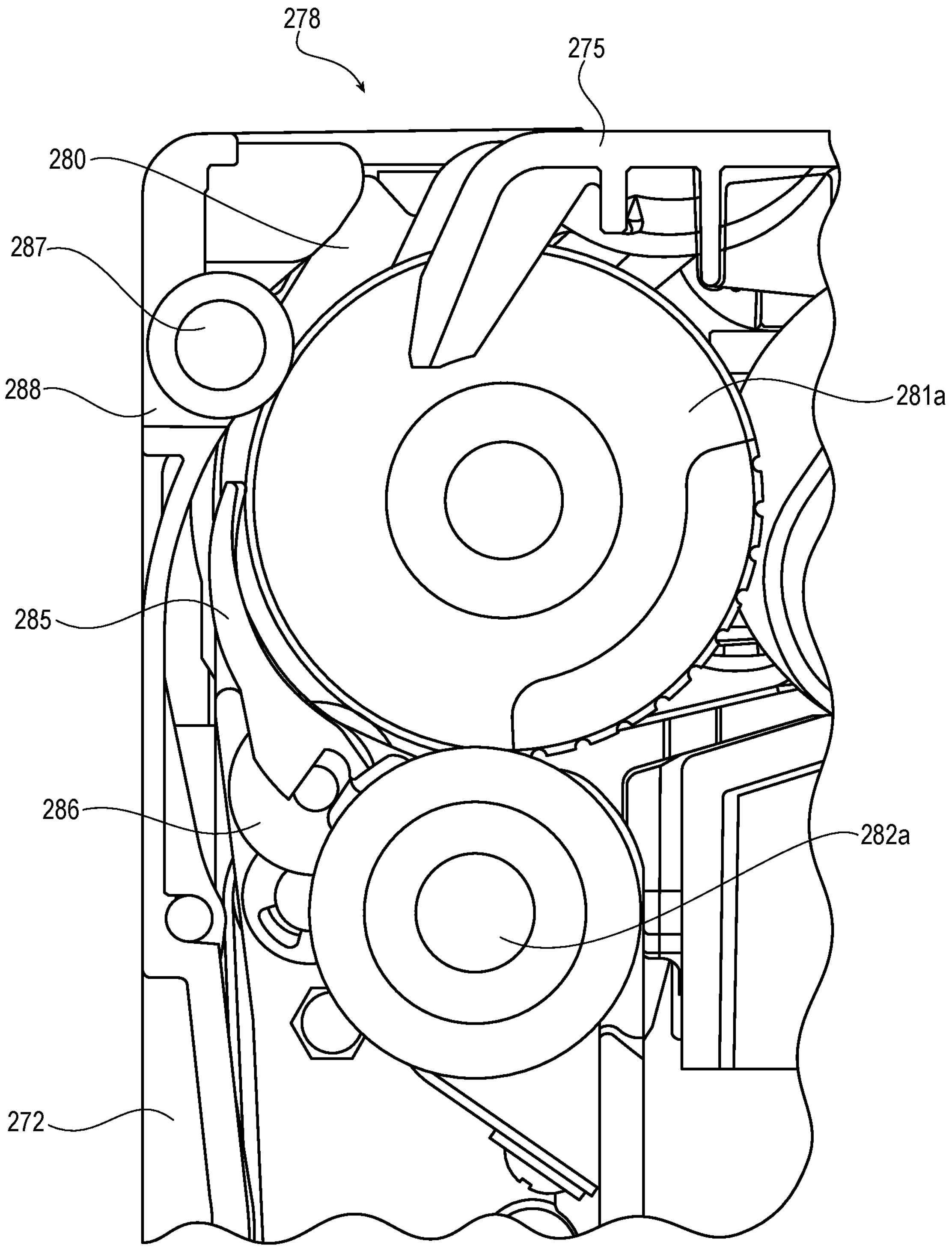
FIG. 10 is an enlarged portion of FIG. 9
Figure 11:
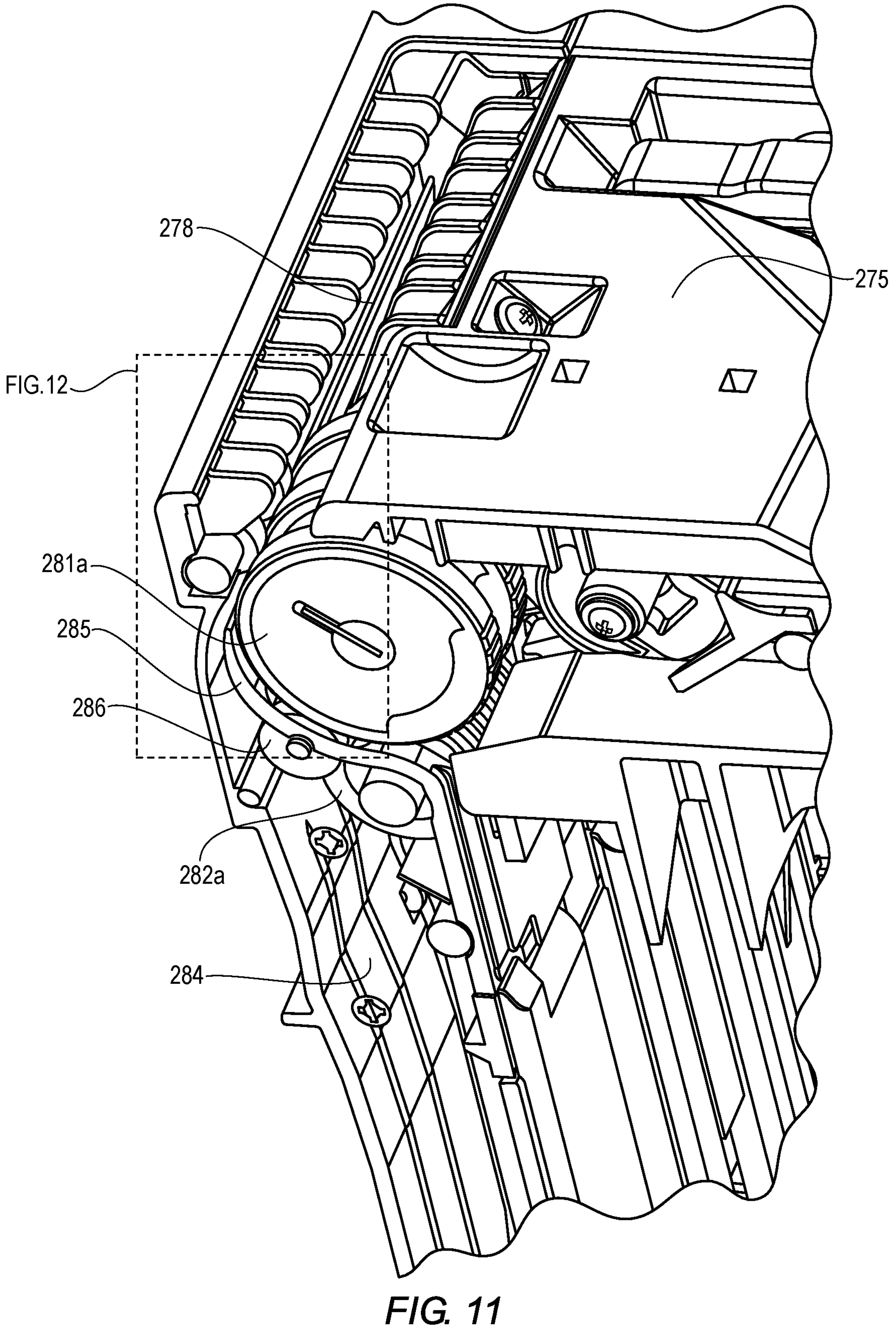
FIG. 11 is a partial right end cross-sectional perspective view of the cassette of FIG. 8.
Figure 12:
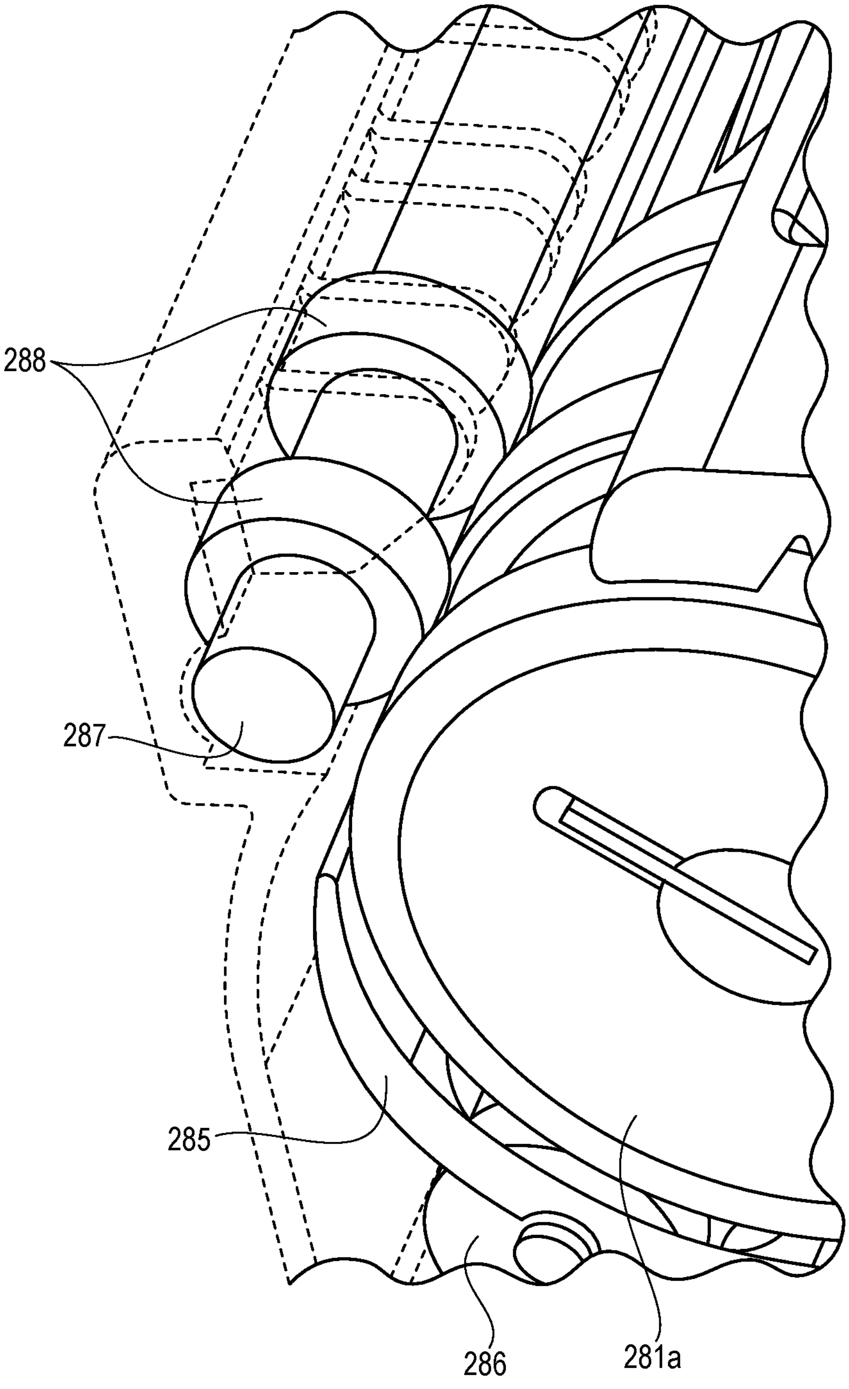
FIG. 12 is an enlarged portion of an area in FIG. 11 that is enclosed by the area marked FIG. 12.

Further, as best shown in FIGS. 10-12, toward the upper end 275 the cassette 244 defines a throat 280 between the slot 278 and a gate 285 for selectively connecting the upper pathway and the throat 280 and the lower pathway and the throat 280. A take-away wheel 286 disposed behind the gate 285. A pinch shaft 287 having pinch wheels 288 disposed there on disposed in the throat 280 proximate the slot 278.

A system for preventing movement of a push plate (or locking the push plate) in a cassette will be explained in FIGS. 13-20. As will be described in more detail herein, infra, the system comprises a push plate catch and release mechanism that will prevent movement of the push plate under specified conditions.

In an example embodiment, the motor coupled with a push plate in a compartment (for example the lower compartment) is inside the compartment and since access to the interior of the compartment is restricted, the motor, or gears coupled with the push plate can't be locked which would prevent movement of the push plate. For example, if while in transport a cassette is dropped, the push plate can move too far and the stack becomes disordered. If the stack becomes disordered, this can cause problems when accepting or dispensing items (such as currency) from the stack.

Described in example embodiments herein is a push plate catch and release mechanism that can prevent movement of the push plate when the motor is not moving the push plate. The push plate stop mechanism prevents the push plate (and stack) from falling more than a predefined (e.g., safe) distance from the slot if the motor is unpowered, the cassette is dropped, and/or subjected to any force that would cause the push plate to move away from the slot. The push plate catch and release mechanism described herein can allow the push plate to be moved manually by customers, in both directions, through its full range of motion as part of normal cassette loading and unloading tasks. The push plate catch and release mechanism described herein allows the motor to drive the push plate, in both directions, through its full range of motion. The push plate catch and release mechanism described herein can be configured to fit in the limited space available inside the dual cassette, and in particular the lower compartment. The push plate catch and release mechanism described herein does not require electronic parts (motors, sensors, solenoids) to be added to the dual cassette to support its function.

As will be described in further detail in an example embodiment herein, infra, the push plate motor drives the push plate up and down through a drivetrain. The drivetrain includes the push plate catch and release mechanism that comprises a catch component and a release component. The catch component and release component are linked together, on a common axis with a limited range of motion relative to each other. A stop part is engaged against the push plate catch and release mechanism when the front (or main) door is closed. When the push plate is driven down by the weight of the stack, the release component is in an inactive position allowing the slot to engage the catch component. The release component is held in the inactive position by the drag from the motor/motor side drivetrain. The catch component engages the stop which prevents further rotation of the push plate catch and release mechanism and stops the push plate motion.

When the motor actively drives the push plate down the release component advances from the inactive position to an active position relative to the stop component. This advancement causes a feature on the release component to prevent the stop component from engaging the catch component and allow further motion of the push plate in a first direction (e.g., downward or away from the slot).

When the front door is opened the stop component disengages from the push plate catch and release mechanism. This allows the push plate to be manually moved through its range of motion to allow loading and unloading of the cassette.

When the push plate is driven or moved in a second direction (e.g., upwards or towards the slot), the configuration of the push plate catch and release mechanism guides the stop component out of the way of the catch component. in other words the stop component, even if engaged by the front door, does not engage the stop when the push plate is moving in direction towards the slot (e.g., upwards) and does nothing to hinder upwards push plate movement The catch component and release component are arranged in such a way that a braking force is generated on the release component when the catch component is stopping the push plate motion, The braking force helps to prevent dynamic overrun of the mechanism.

In an example embodiment, a feature on the front door takes the load on the stop exerted by the catch, when the door is opened this feature allows the stop to move away from the catch reducing the contact force and allowing the stop to reliably disengage from the catch under all conditions, this was added after the original description of the catch release mechanism)

Figure 13:
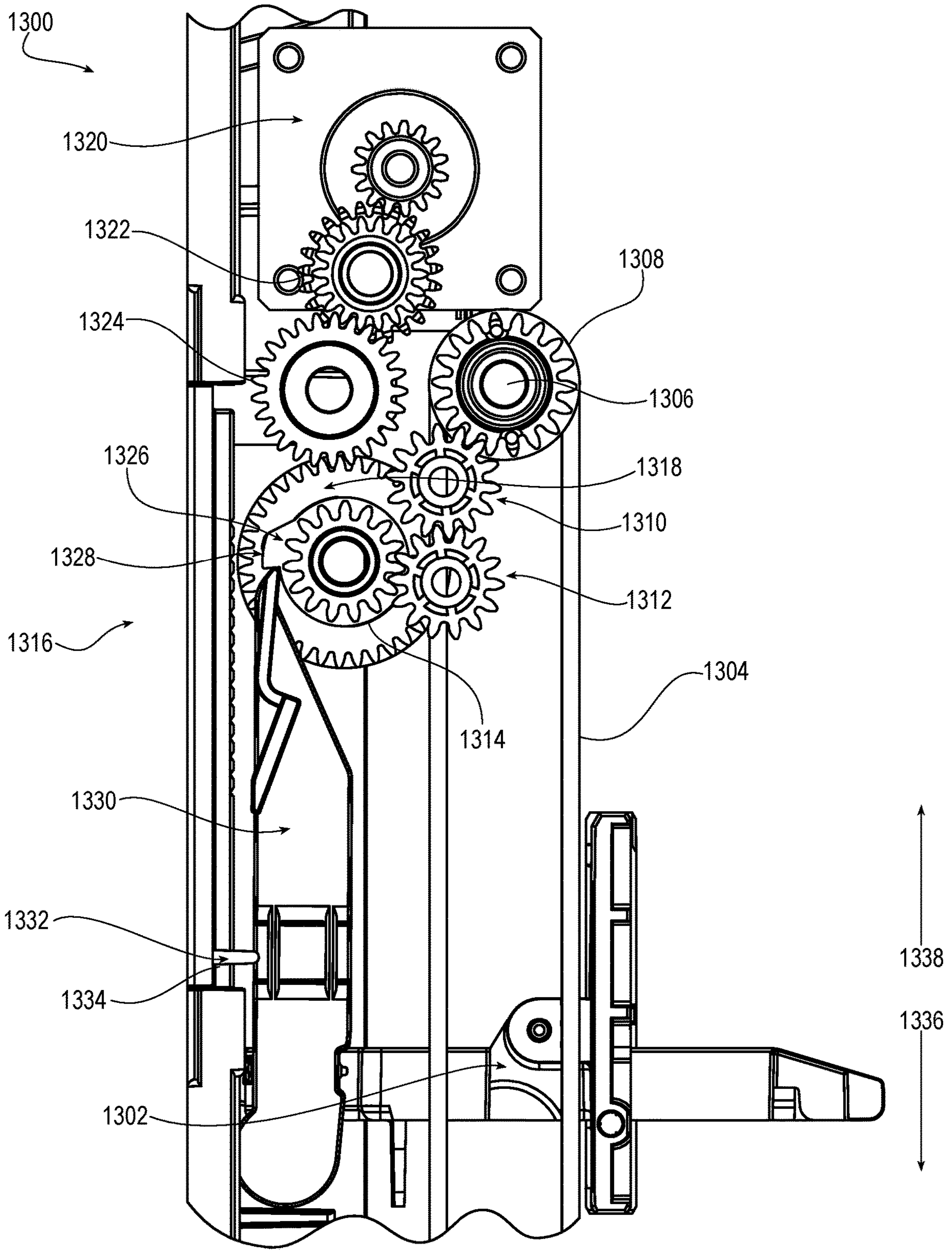
FIG. 13 illustrates an example of the interior of a compartment in a cassette with a system for moving a push plate that comprises a catch and release mechanism for locking the push plate when a predefined condition occurs.

FIG. 13 illustrates an example of the interior of a compartment in a cassette, such as for example cassette 144 illustrated in FIGS. 1-7 or cassette 244 illustrated in FIGS. 8-12, with a system 1300 for moving a push plate 1302 that comprises a catch and release mechanism 1316 for locking the push plate 1302 when a predefined condition occurs. In an example embodiment, the catch and release mechanism 1316 is operable to prevent the push plate from moving in a predefined direction, for example if the cassette is dropped. The system 1300 comprises a push plate 1302, a belt 1304 that couples the push plate 1302 to a pulley (not shown) mounted on a shaft 1306 that also has a gear 1308 mounted thereon. Gears 1310 and 1312 couple the gear 1308 to the second gear 1314 of the catch and release mechanism 1316. The first gear 1318 of the catch and release mechanism 1316 is coupled with motor 1320 via gears 1322 and 1324. The catch and release mechanism 1316 further comprises a catch 1326 and a release 1328, the operation of the catch 1326 and release 1328 will be explained herein, infra. The stop 1330 engages the catch and release mechanism 1316 when the cassette's front door 1332 is closed, causing the rib 1334 to push the stop 1330 into a position that causes the stop 1330 to engage the catch and release mechanism 1316.

In the illustrated example, when the push plate 1302 moves in a first direction (down) as indicated by arrow 1336, the catch and release mechanism 1316 the first gear 1318 and second gear 1314 of the catch and release mechanism 1316 rotate counterclockwise. When the push plate 1302 moves in a second direction 1338, the first gear 1318 and second gear 1314 of the catch and release mechanism rotate clockwise. However, as those skilled in the art can readily appreciate, the catch and release mechanism 1316 described herein can be configured where the first direction is clockwise and the second direction is counterclockwise.

In an example embodiment, the push plate 1302 is employed for urging sheets in a stack (such as documents or currency) towards a slot (see e.g., slot 178 in FIGS. 1-7 and/or slot 278 in FIGS. 8-12). When sheets are being added to the compartment, the motor 1320 causes the catch and release mechanism 1316 to move counterclockwise, causing the push plate 1302 to move in direction 1336 to make room for the additional sheets. When sheets are being dispensed from the compartment, the motor 1320 causes the catch and release mechanism 1316 to move clockwise, causing the push plate 1302 to move in direction 1338.

As noted herein, a problem can occur if movement of the push plate 1302 in direction 1336 is caused by a something other than the motor. For example, if the cassette is dropped during transport. Because the motor 1320, and the gears 1308, 1310, 1322, 1322, 1324 are inside the compartment, locking the push plate 1302 to prevent movement during transport can be difficult without providing access to the interior of the compartment which may not be desirable. As will be described herein, the catch and release mechanism 1316 described herein can prevent movement of the push plate 1302 in direction 1336 and preserve the integrity of the stack of notes.

Figure 14:
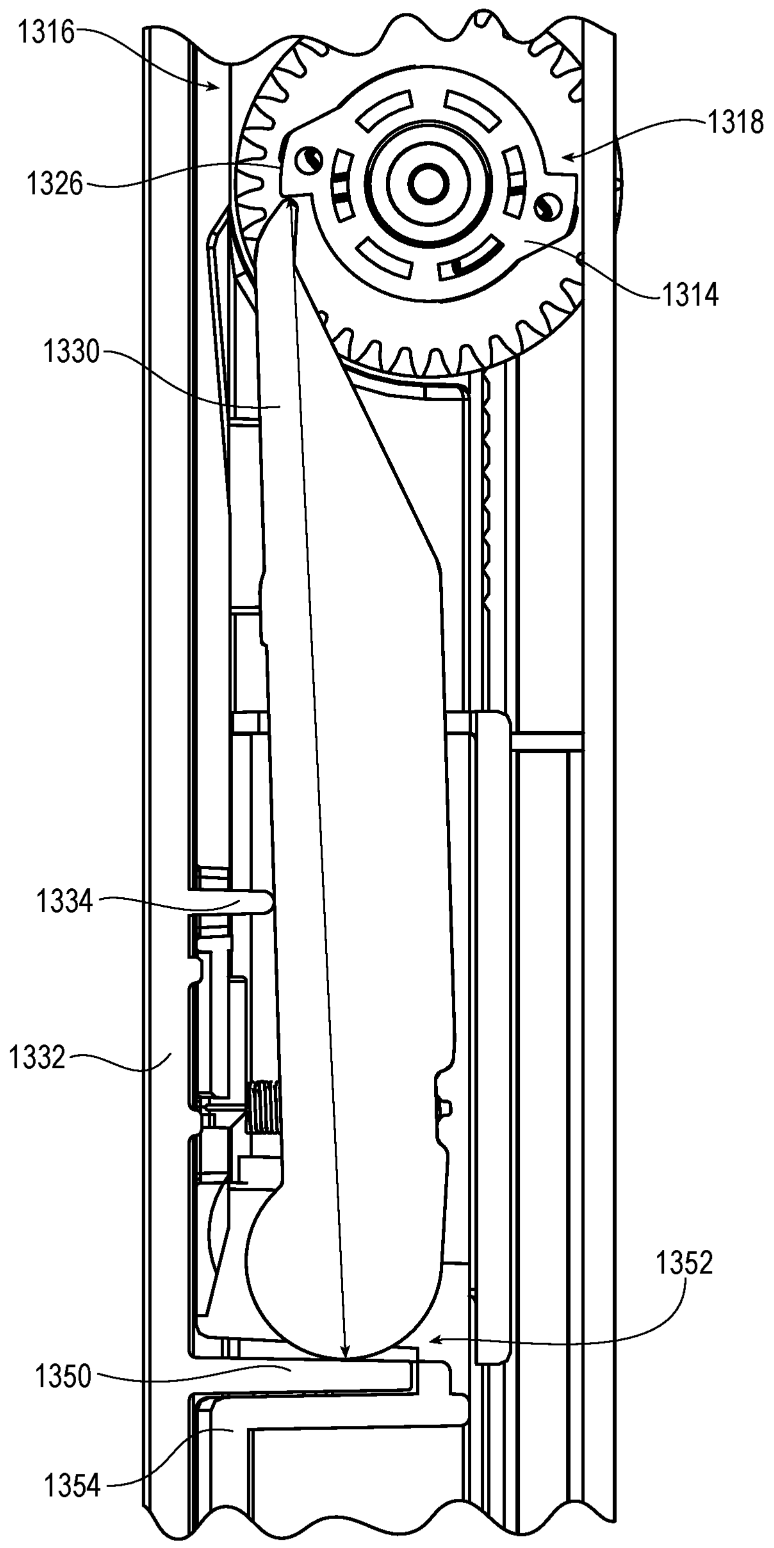
FIG. 14 is a partial view of the interior of a compartment in a cassette that illustrates an embodiment where the door comprises an additional rib for engaging the stop.

FIG. 14 is a partial view of the interior of a compartment in a cassette that illustrates an embodiment where the door 1332 comprises an additional (second) rib 1350 for engaging the stop 1330. When the catch 1326 engages the stop 1330, the load from the push plate 1302 (FIG. 13) is transferred to the second rib 1350 from the end 1352 of the stop 1330. When the door 1332 is opened, the end 1352 of stop 1350 is no longer in contact with the second rib 1350 which allows the stop 1330 to move and disengage from the catch 1326, relieving the load from the push plate 1302 (FIG. 13) from the stop 1330, This can allow for the push plate 1302 (FIG. 13) to be moved down the (direction indicated by arrow 1336 in FIG. 13). In particular embodiments, when the door 1332 is closed, a portion of the door frame 1354 abuts the door rib 1350 for additional strength.

Figure 15:
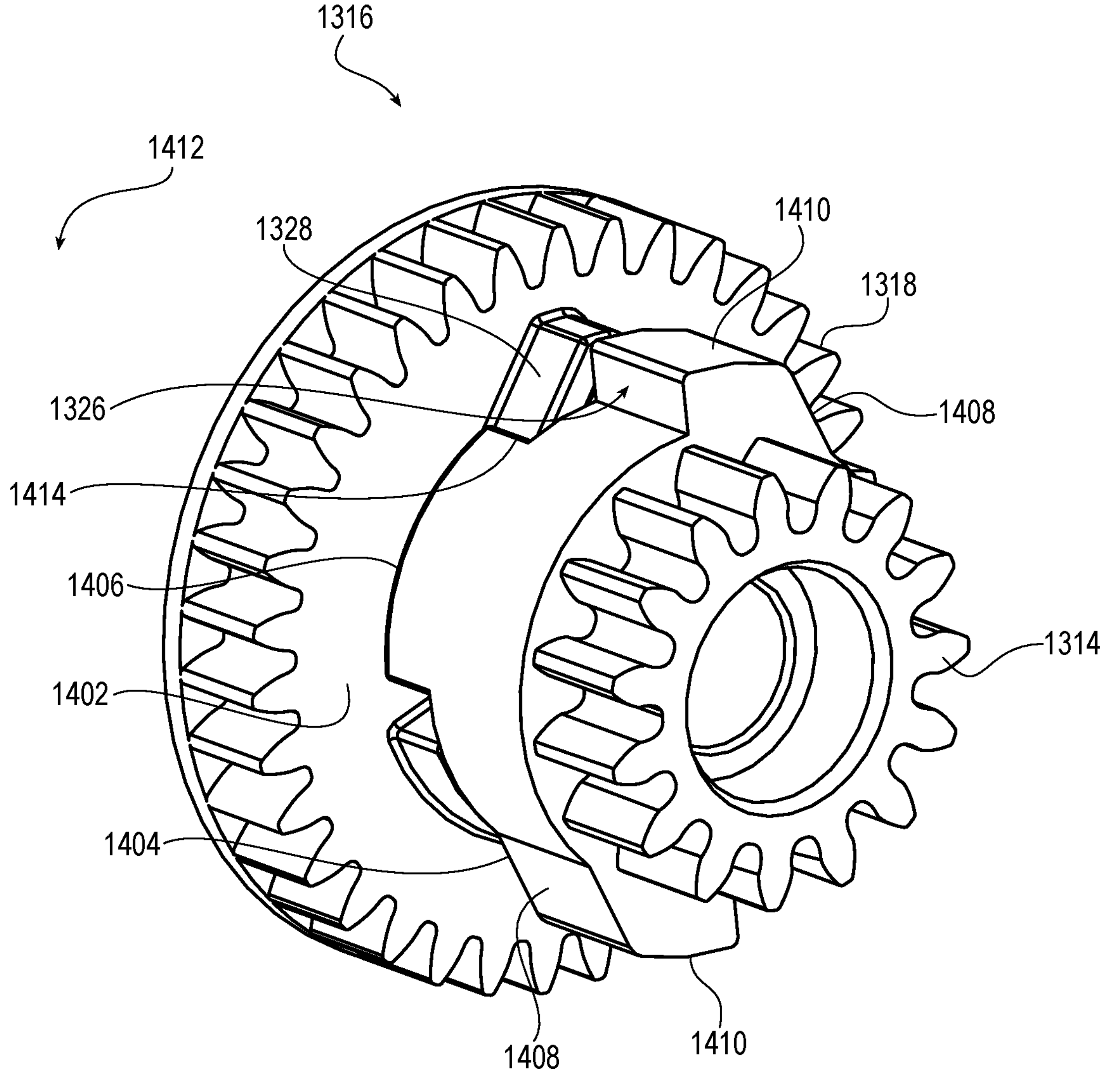
FIG. 15 is a perspective view illustrating an example of the catch and release mechanism.

FIG. 15 is a perspective view illustrating an example of the catch and release mechanism 1316. The first gear 1318 comprises a top surface 1402. The release 1328 extends from the top surface 1402. the second gear 1314 comprises a body 1404, surface 1406 extending from the body that abuts the first gear 1318, an arm 1408 with a surface 1410.

The first and second gears are configured so that they rotate with respect to each other. For example, the first gear can be fixed while the second gear can rotate with respect to the first gear, or the second gear can be fixed and the first gear can rotate with respect to the second gear.

In operation, when a force is applied to the first gear 1318 causing the first gear 1318 to rotate in the counterclockwise direction as indicated by arrow 1412, the first gear rotates independently until the release 1328 engages a side 1414 of the surface 1406 extending from the body 1404 of the second gear 1314. Upon the catch 1326 engaging the side 1414 of the surface 1406 of the surface 1406 extending from the body 1404 of the second gear 1314, the first gear 1318 and second gear 1314 rotate together.

In the illustrated example, the second gear 1314 has two arms 1410. Those skilled in the art can readily appreciate that the number of arms 1410, extending from the body 1404 of the second gear 1314 can be any physically realizable number. For example, the number of arms can be selected depending on how far a push is allowed to move in the first direction when the motor is not driving the first gear.

Figure 16:
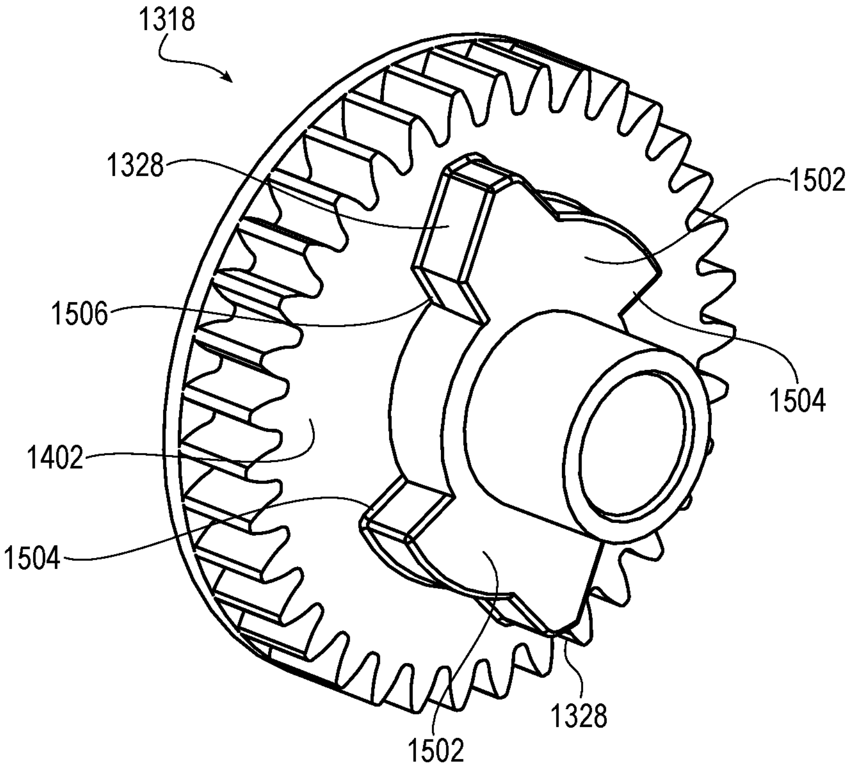
FIG. 16 is a perspective view illustrating an example of the first gear of the catch and release mechanism.

FIG. 16 is a perspective view illustrating an example of the first gear 1318 of the catch and release mechanism. The first gear 1318 comprises a pair of raised surfaces 1502. The raised surface comprises the release 1328 on one end and backstop 1504, and front stop 1506. The backstop 1504 is configured to limit the amount of rotation between the first gear 1318 and the second gear 1314 when a force is being applied to the second gear 1314 and not the first gear 1318. In an example embodiment, the stop 1504 is configured to position the release 1502 under an arm 1408 of the second gear 1314 when a force is applied to the second gear and not the first gear. As will be described herein, movement of the release 1328 under the arm 1408 of the second gear will allow the stop 1330 to engage the catch 1326. The front stop 1506 is configured to limit the rotation between the first gear 1318 and second gear 1314 to position the release 1328 to engage the stop 1330.

Figure 17:
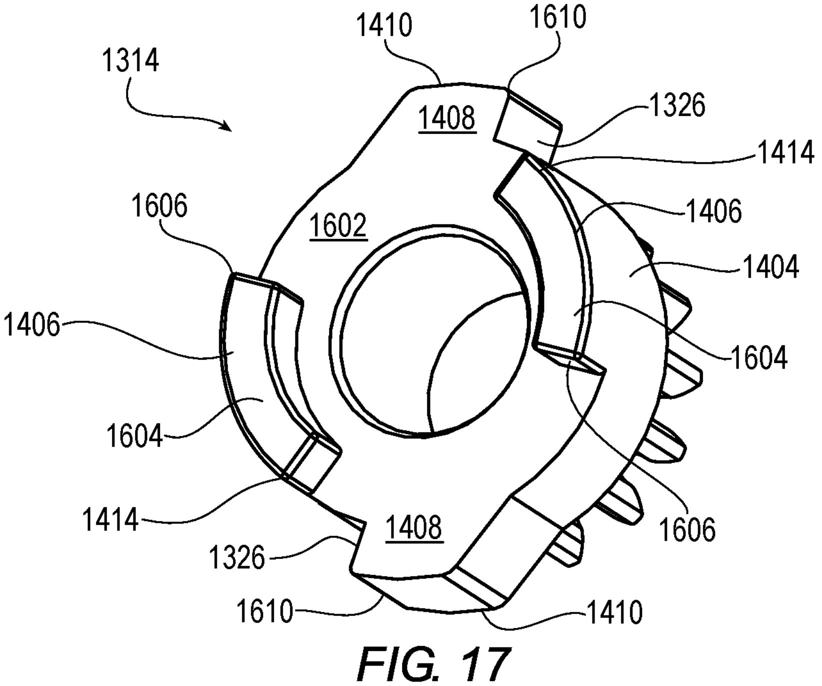
FIG. 17 is a perspective view illustrating an example of the bottom of second gear of the catch and release mechanism.

FIG. 17 is a perspective view illustrating an example of the bottom of the second gear 1314 of the catch and release mechanism 1316. The bottom of the second gear 1314 comprises a bottom surface 1602. Curved surfaces 1406 extend from the bottom surface 1602 of the second gear 1314. The curved surfaces 1406 comprise a bottom surface 1604 that abuts the top surface 1402 first gear 1318. The curves surfaces 1406 further comprise a first face 1414 that engages the front stop 1506 of the first gear 1318 so that the release 1328 prevents the stop 1330 from engaging the catch 1326 and a second face 1606 that engages the backstop 1504 of the first gear 1318. The catch 1326 is located at a side 1610 of the arm 1410.

Figure 18:
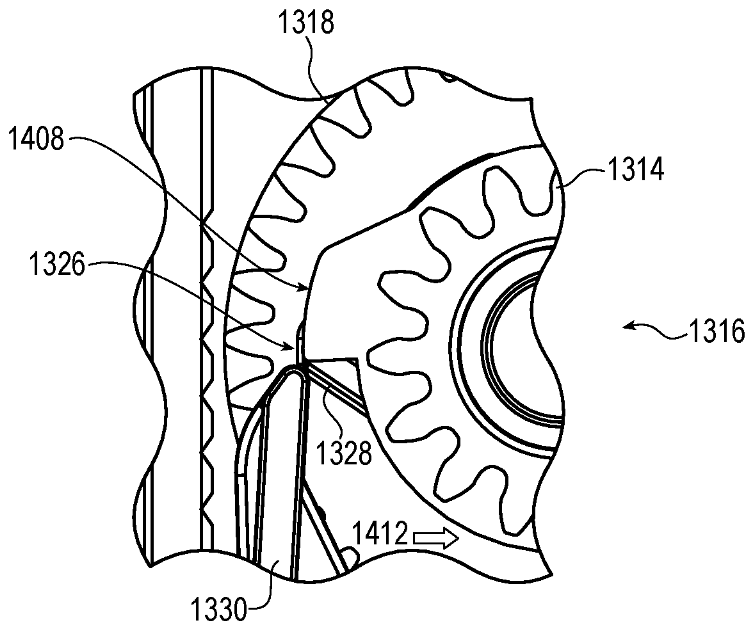
FIG. 18 illustrates an example of the operation of the catch and release mechanism and stop when the catch and release mechanism is rotating in the first direction that is caused by a force exerted on the first gear.

FIG. 18 illustrates an example of the operation of the catch and release mechanism 1316 and stop 1330 when the catch and release mechanism 1316 is rotating counterclockwise (the first direction 1412) that is caused by a force exerted on the first gear 1318. Because force is being applied to the first gear 1318, the release 1318 moves into the illustrated position and once the release 1318 engages the second gear 1314, both the first and second gears rotate together. While the release 1328 is in the illustrated position, the stop moves around the catch 1326 without engaging the catch 1326. Thus, the catch and release mechanism 1316 will continue rotating in the first direction 1412 and the push plate 1302 moves in direction illustrated by arrow 1336.

Figure 19:
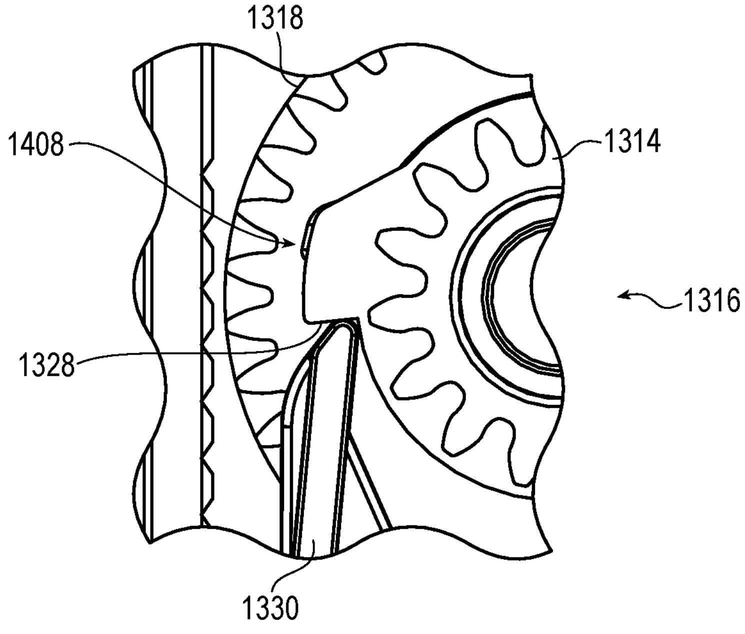
FIG. 19 illustrates an example of the operation of the catch and release mechanism and stop when the catch and release mechanism is rotating in the first direction that is caused by a force exerted on the second gear.

FIG. 19 illustrates an example of the operation of the catch and release mechanism 1316 and stop 1330 when the catch and release mechanism 1316 is rotating in the first direction that is caused by a force exerted on the second gear 1314. Because the force is applied to the second gear, the second gear moves until the release 1326 moves under the arm 1408 of the second gear 1314 allowing the stop 330 to engage the catch 1328 as illustrated in FIG. 18. In an example embodiment, the first gear 1318 comprises a backstop 1504 which upon engaging the second gear 1318 causes the first gear and second gear to rotate together. When the stop 1330 engages the catch 1328, rotational movement of the catch and release mechanism 1316 stops. This stops movement of the push plate 1302 away from the slot in the direction indicated by arrow 1336.

Figure 20:
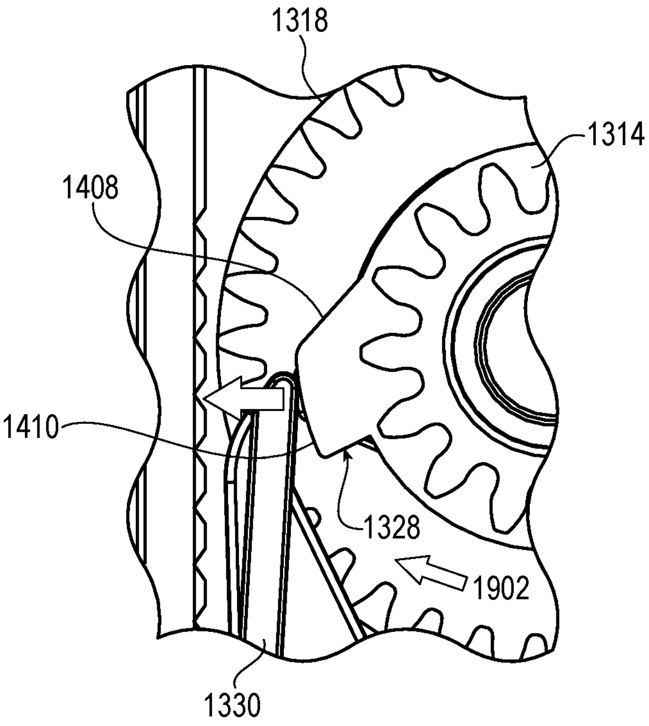
FIG. 20 is illustrates an example of the operation of the catch and release mechanism and stop when the catch and release mechanism is moving in a second direction.

FIG. 20 is illustrates an example of the operation of the catch and release mechanism 1316 and stop 1330 when the catch and release mechanism 1316 is moving in a second direction (clockwise) that is indicated by arrow 1902. While moving clockwise, the stop 1330 is guided by surface 1410 of arm 1408 to avoid engaging the catch 1328. Thus, movement of the catch and release mechanism 1316 is not impeded allowing the push plate 1302 to move in the direction indicated by arrow 1338.

Figure 21:
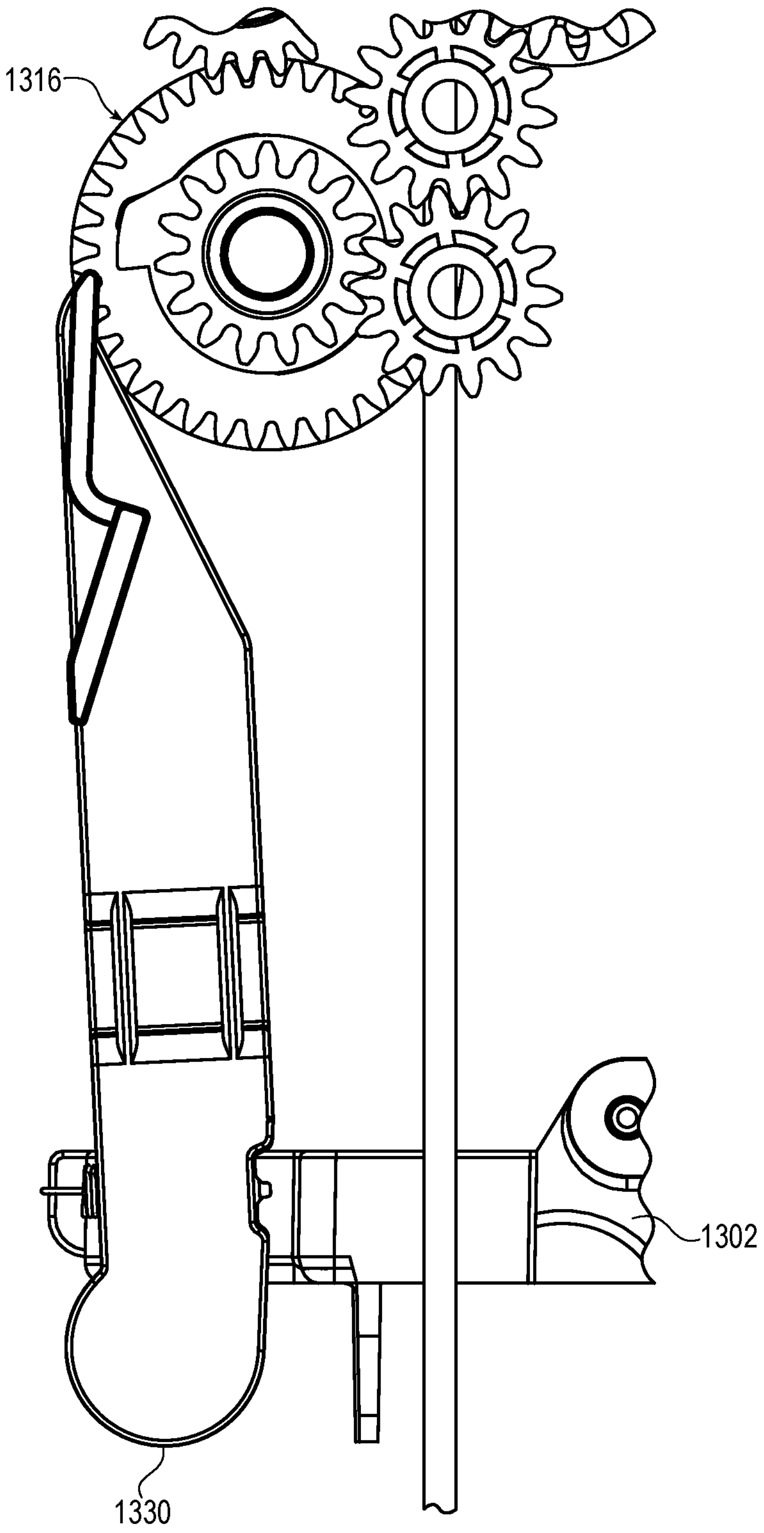
FIG. 21 illustrates an example of the catch and release mechanism and stop when the front door to the cassette is open.

FIG. 21 illustrates an example of the catch and release mechanism 1316 and stop 1330 when the front door 1332 to the cassette is open. When the front door 1332 is open, the rib 1334 does not engage the stop 1330, therefore, the stop does not engage the stop and release mechanism 1316. This can allow the push plate to be manually moved in either direction to manually load or unload sheets from the cassette.

Figure 22:
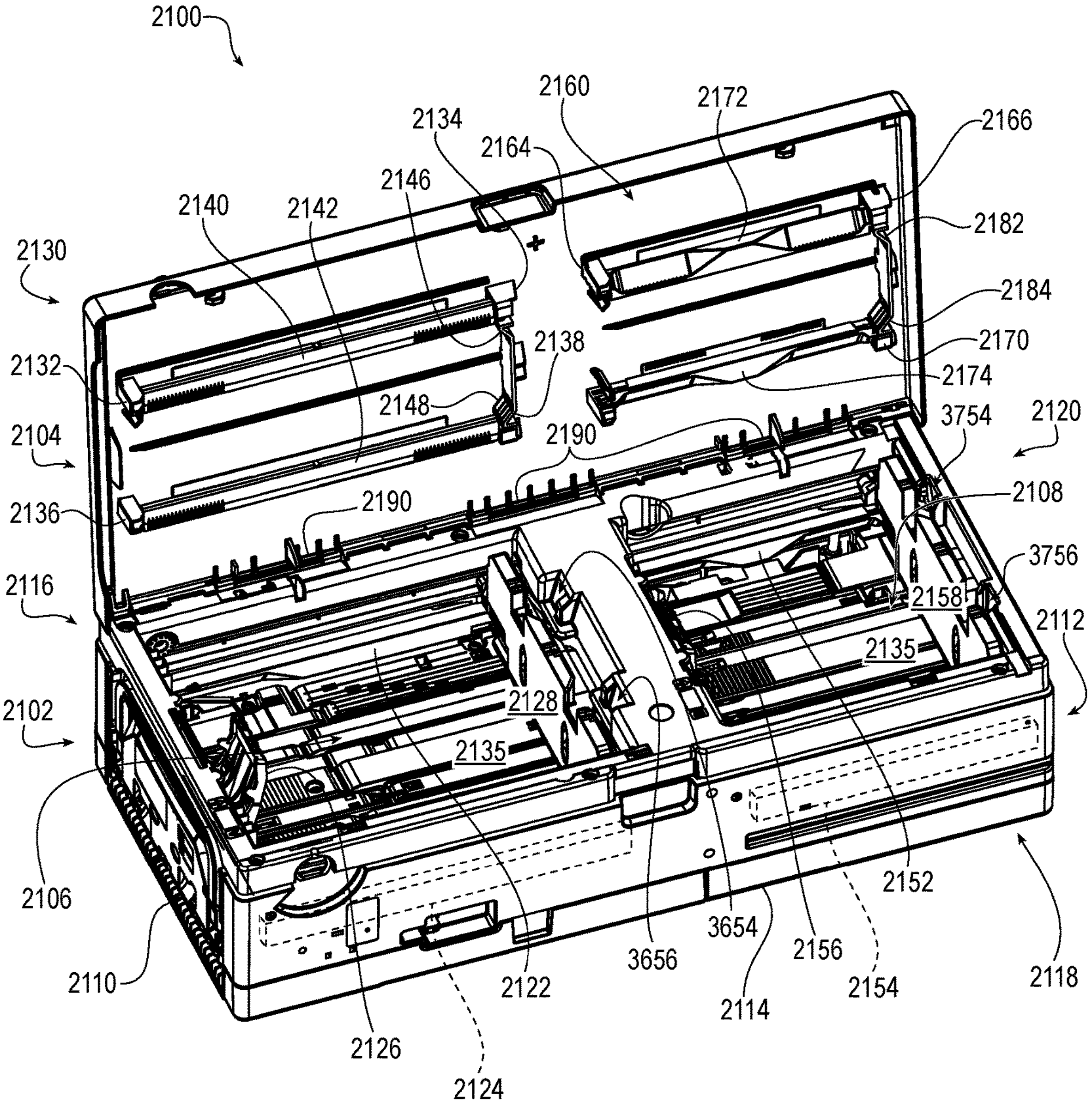
FIG. 22 is a perspective view that illustrates an example of a cassette configured in accordance with an example embodiment.

FIG. 22 illustrates an example of a cassette 2100 configured in accordance with an example embodiment. The cassette comprises a body 2102 and a front door 2104.

The body 2102 of the cassette 2100 comprises a first compartment 2106 (which may also be referred to herein as the upper compartment) 2106 and a second compartment (which may also be referred to herein as the lower compartment) 2108. the body 2102 of the cassette 2100 further comprises a top side 2110, a bottom side 2112, a left side 2114, a right side 2116, and a rear side 2118 and a front side 2120. When open, the front door 2104 provides access to the interior of the cassette (e.g., compartments 2106 and 2108) via the front side 2120 of the cassette 2100. When the front door 2104 is closed, the front door 2104 engages the top side 2110, the bottom side 2112, the left side 2114, and the right side 2116, and forms the front side 2120 of the body 2102 of the cassette 2100. For ease of illustration, the left side 2114 is illustrated as being transparent.

The first compartment 2106 comprises a floor 2135, a first (right) rail 2122 that has a first shape and is coupled to a first (upper) bracket 2126 and the second (lower) bracket 2128, A second (left) rail 2124 that has a second shape is coupled to the first bracket 2126 and the second bracket 2128. As will be shown and described herein, the first rail 2122, second rail 2124, first bracket 2126, and second bracket 2128 are shaped and configured so that the rails mate with the appropriate side of brackets 2126, 2128 and cannot be inserted in reverse order and/or upside down.

In an example embodiment, as will be described herein, infra, the first bracket 2126 and second bracket 2128 have a plurality of pockets (see e.g., FIG. 23). The plurality of pockets allow for the first rail 2122 and second rail 2124 to be adjusted to different widths.

The second compartment 2108 comprises a floor 2135, a third (upper) bracket 2156, fourth (lower) bracket 2158. A third rail 2152 with a third shape and fourth rail 2154 having a fourth shape that are coupled with the third bracket 2156 and fourth bracket 2158. As will be shown and described herein, the third rail 2152, fourth rail 2154, upper bracket 2156, and second bracket 2158 are shaped and configured so that the rails mate with the appropriate side of brackets 2156, 2158 and cannot be inserted in reverse order and/or upside down.

In an example embodiment, as will be described herein, infra, the third bracket 2156 and fourth bracket 2158 have a plurality of pockets (see e.g., FIGS. 26-27). The plurality of pockets allows for the third rail 2152 and fourth rail 2154 to be adjusted to different widths.

The front door 2104 comprises a first front door bracket assembly 2130 positioned to fit within the first compartment 2106 while the front door is in a closed position, The first front door bracket assembly 2130 comprising a first front door height adjustment bracket 2132, a second front door height adjustment bracket 2134, a third front door height adjustment bracket 2136, a fourth front door height adjustment bracket 2138, a first front door rail 2140 having a fifth shape is configured to engage the first front door height adjustment bracket 2132 and the second front door height adjustment bracket 2134 in a first predefined height position, a second front door rail 2142 having a seventh shape s configured to engage the third height adjustment bracket 2136 and fourth height adjustment bracket 2138 in a second predefined height position and a first rail release lever 2146 The first rail release lever 2146 is configured to bias the first front door rail 2140 against the second front door height adjustment bracket 2134, and the second rail release lever 2148 is configured to bias the second front door rail 2142 against the fourth height adjustment bracket 2138.

The front door 2104, further comprises a second front door bracket assembly 2160 positioned to fit within the second compartment 2108 while the front door is in a closed position. The second front door bracket assembly comprises a fifth front door height adjustment bracket 2164, a sixth front door height adjustment bracket 2166, a seventh front door height adjustment bracket 2168, an eighth front door height adjustment bracket 2170, a third front door rail 2172 having a seventh shape and configured to engage the fifth front door height adjustment bracket 2164 and the sixth front door height adjustment bracket 2166 in a third predefined height position, a fourth front door rail 2174 having an eight shape configured to engage the seventh height adjustment bracket 2168 and eighth height adjustment bracket 2170 in a fourth predefined height position and third and fourth rail release levers 2182, 2184, the third rail release lever 2182 is configured to bias the third front door rail 2172 against the sixth front door adjustment bracket 2164, and the second rail release lever 2184 is configured to bias the fourth front door rail 2174 against the eighth height adjustment bracket 2184.

In an example embodiment, the first shape, second shape, third shape, fourth shape, fifth shape, sixth shape, seventh shape, and eighth shape corresponding to rails 2122, 2124, 2140, 2142, 2152, 2154, 2172, 2174 respectively are unique (e.g., no two shapes are alike). This ensures that the rails are installed on the correct brackets and correct orientation. Thus for example, the first rail 2122 cannot be installed where rails 2124, 2140, 2142, 2152, 2154, 2172 or 2176 belong. As will be described herein infra, rails 2122, 2124, 2140, 2142, 2152, 2154, 2172, 2174 can be installed, adjusted, or removed manually, e.g., without tools.

In the illustrated example the front door 2104 is hingeably attached to the body 2102 via hinges 2190. However those skilled in the art can readily appreciate that any the front door 2104 can be attached to the body 2102 by any suitable technique.

As those skilled in the art can readily appreciate, sheets such as currency notes or other documents, are inserted into the first compartment 2106 and held in place by the first rail 2122, second rail 2124, front door rails 2140, 2142 and floor 2135. The rails 2122, 2124, 2140, 2142 can be adjusted to comport with the size of the sheets being held in the first compartment 2106. Similarly, sheets such as currency notes or other documents, are inserted into the second compartment 2108 and held in place by the third rail 2152, fourth rail 2154, front door rails 2172, 2174 and floor 2135. The rails 2152, 2154, 2172, 2174 can be adjusted to comport with the size of the sheets being held in the second compartment 2108.

In an example embodiment, instead of each rail being unique, the pairs are unique resulting in four unique pairs instead of eight unique rails. For example, rails 2140 and 2142 can be mirrors of each other and brackets 2132, 2134 or 2136, 2138 are configured to accept the rail in the correct direction. Similarly, rails 2122 and 2124, can be mirrors of each other 2152 and 2154 can be the mirrors of each other , and rails 2172 and 2174 can be the mirrors of each other.

FIGS. 23-26 illustrate an example of the first compartment 2106 and the configuration of the brackets 2126, 2128 and rails therein 2122, 2124. The brackets 2126, 2128 and rails are configured to ensure that the rails 2122, 2124 are installed correctly. The first rail 2122 is configured to engage brackets 2126, 2128 in a first predefined position and the second rail 2124 is configured to engage brackets 2126, 2128 in a second predefined position.

Figure 23:
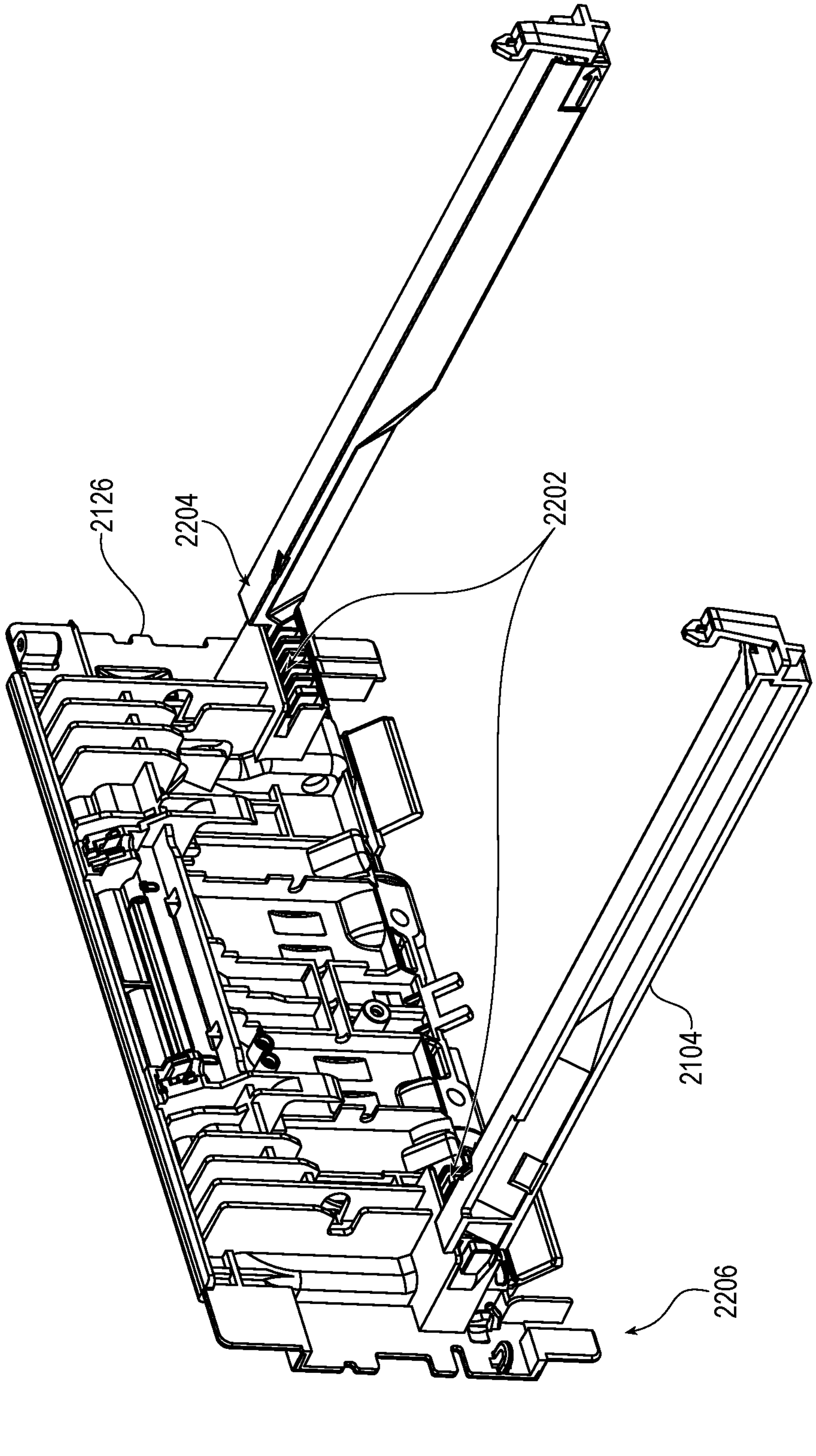
FIG. 23 illustrates an example of a first compartment, illustrating the first (upper) bracket with rails attached.

FIG. 23 illustrates an example of the first (or upper) compartment 2106, illustrating first (or upper) bracket 2126 with rails 2122, 2124 attached. The first bracket, 2126 has a plurality of pockets 2202 on each side 2204, 2206 of the bracket 2126. The plurality of pockets 2126 allow for adjustment of rails. This can allow the first compartment 2106 to be configured to hold sheets of various sizes.

Figure 24:
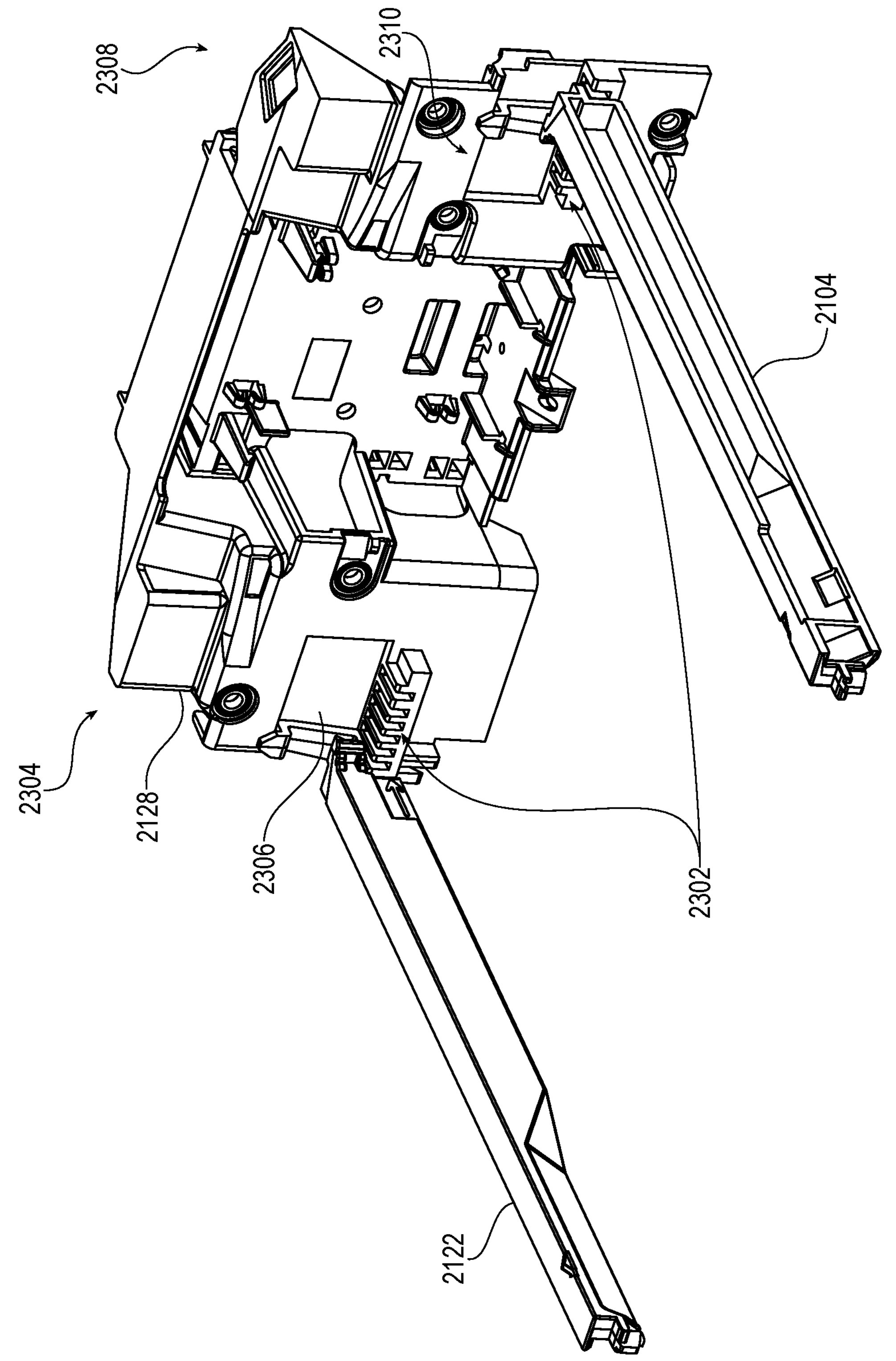
FIG. 24 illustrates an example of a first compartment, illustrating second (lower) bracket with rails attached.

FIG. 24 illustrates an example of a first compartment 2106, illustrating the second (lower) bracket 2128 with rails attached 2122, 2124. The second bracket 2128 comprises a plurality of pockets 2302 on each side 2304, 2306 that correspond to the plurality of pockets 2302 of brace 2126. The first side 2304 comprises a first window or cutout section 2306. The second side 2306 comprises a second window or cutout section 2310.

In an example embodiment, the distance between the plurality of pockets 2202 on the first side 2204 of bracket 2126 and the plurality of pockets 302 on the first side 2304 of the second bracket 2128 is different than the distance between the plurality of pockets 2202 on the second side 2206 of the first bracket and the plurality of pockets 2302 on the second side 2306 of bracket 2128. In particular embodiments, the height of the window or cutout 2306 is different than the height of the window or cutout 2308.

Figure 25:
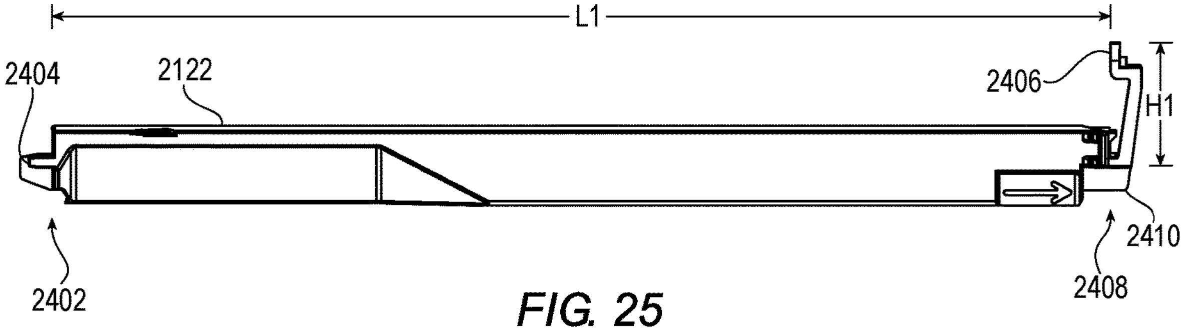
FIG. 25 illustrates an example of the first rail in the first compartment.

FIG. 25 illustrates an example of the first rail 2122 employed in the first compartment. The first rail 2122 comprises a first sides 2402 where a protrusion 2404 is located for engaging a pocket selected from the plurality of pockets in bracket 2126. A plastic snap 2406 is located on the second side 2408 of the first rail 2122 and is configured to engage the window or cutout 2306 in the second bracket 2128. A protrusion 2410 is configured to engage a pocket selected from the plurality of pockets 2302 on the first side 2304 of the second bracket 2128.

Figure 26:
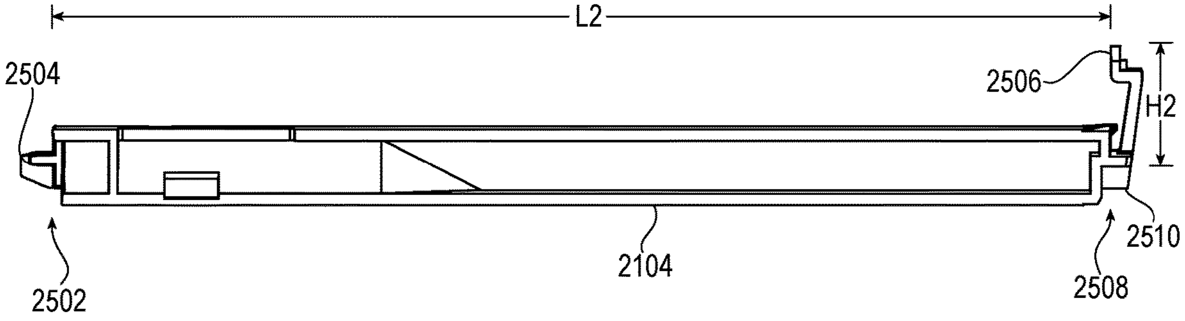
FIG. 26 illustrates an example of the second rail in the first compartment.

FIG. 26 illustrates an example of the second rail 2124 in the first compartment. The second rail 2124 comprises a first sides 2502 where a protrusion 2504 is located for engaging a pocket selected from the plurality of pockets 202 on the second side 206 of bracket 2126. A plastic snap 2506 is located on the second side 2508 of the second rail 2124 and is configured to engage the window or cutout 308 in the second bracket 2128. A protrusion 2510 is configured to engage a pocket selected from the plurality of pockets 302 on the second side 308 of the second bracket 2128.

In an example embodiment, the first rail 2122 has a first length L1 and the second rail 2124 has a length L2. The lengths of L1 and L2 are different to prevent the rails 2122, 2124 from being installed in the wrong side of brackets 2126, 2128. Accordingly, the pockets 2202 and 2302 are positioned in accordance with lengths L1 and L2. Although the illustrated example shows L1 as longer than L2, those skilled in the art should readily appreciate that in other embodiments L2 is longer than L1.

In an example embodiment, snap 2406 has a height H1 and snap 2402 has a height H2. The heights of H1 and H2 are different to prevent the rails 2122, 2124 from being installed on the wrong side of brackets 2126, 2128 and can further ensure that the rails are oriented correctly (e.g., not upside down). Accordingly, windows or cutouts 2306, 2310 are sized to accepts snaps 2406, 2508 respectively. Protrusion 2410 is configured to fit into a selected pocket from the plurality of pockets 2302 on the first side of bracket 128 and protrusion 2510 is configured to fit into a selected pocket from the plurality of pockets 2302 located on the second side 2308 of bracket 2128. In an example embodiment, protrusion 2410 and protrusion 2510 have different lengths for keying to the correct side.

FIGS. 27-32 illustrate an example of the second compartment 2108 and the configuration of the brackets 2156, 2158 and rails therein 2152, 2154. The brackets 2156, 2158 and rails 2152, 2154 are configured to ensure that the rails 2152, 2154 are installed correctly. The second compartment first rail 2152 is configured to engage brackets 2156, 2158 in a first predefined position and the second compartment second rail 2154 is configured to engage brackets 2156, 2158 in a second predefined position.

Figure 27:
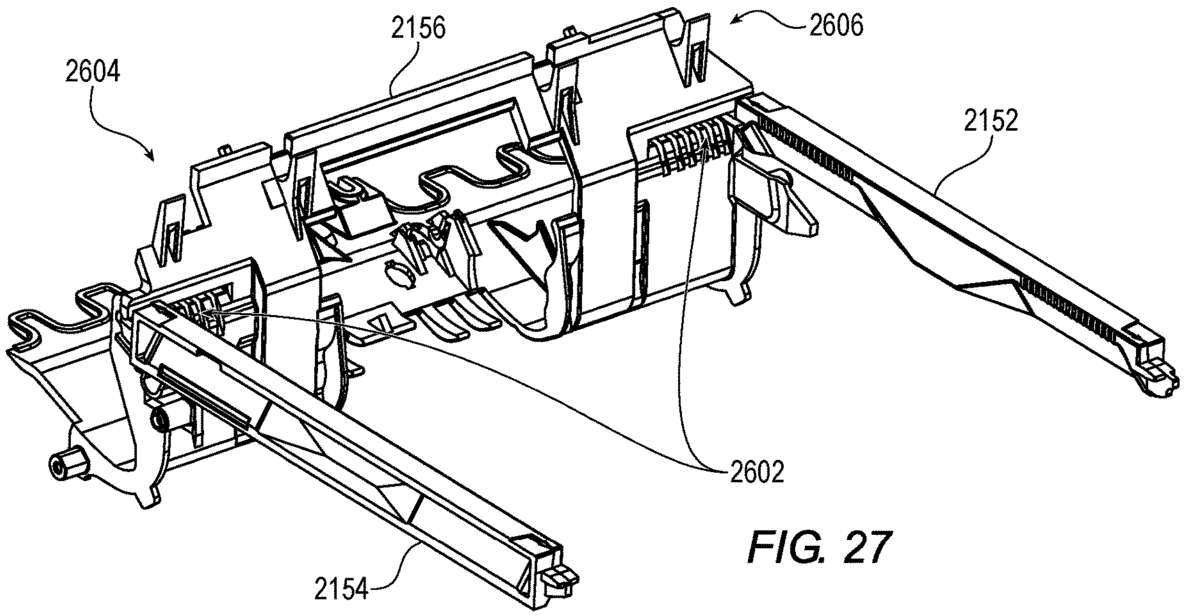
FIG. 27 illustrates an example of the first (upper) bracket in the second compartment with rails attached.

FIG. 27 illustrates an example of the second compartment first (upper) bracket 2156 in the second compartment 2108 with rails attached 2152, 2154. The first bracket 2156 comprises a plurality of pockets 2602 on each side 2604, 2606 that are configured to receive an end of the appropriate bracket. The plurality of pockets 2602 allow for adjustment of rails. This can allow the second compartment 2108 to be configured to hold sheets of various sizes.

Figure 28:
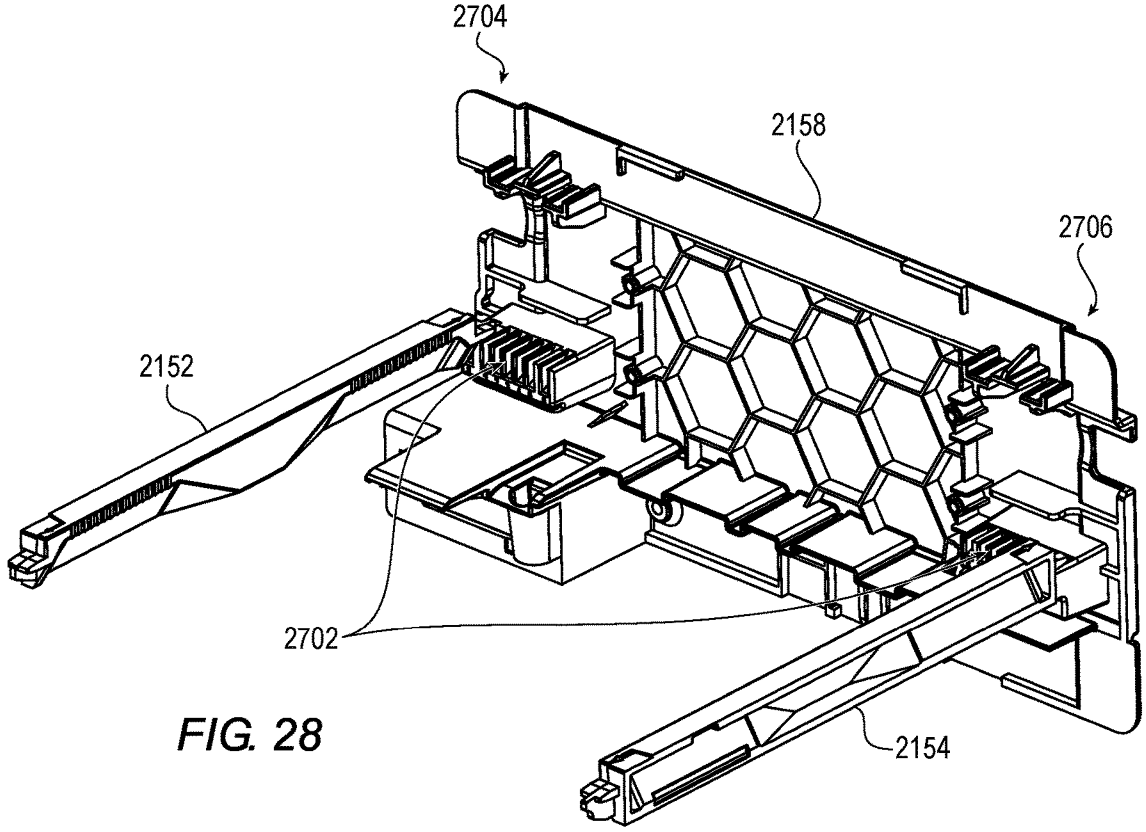
FIG. 28 illustrates an example of the second (lower) bracket in the second compartment with rails attached.
Figure 29:
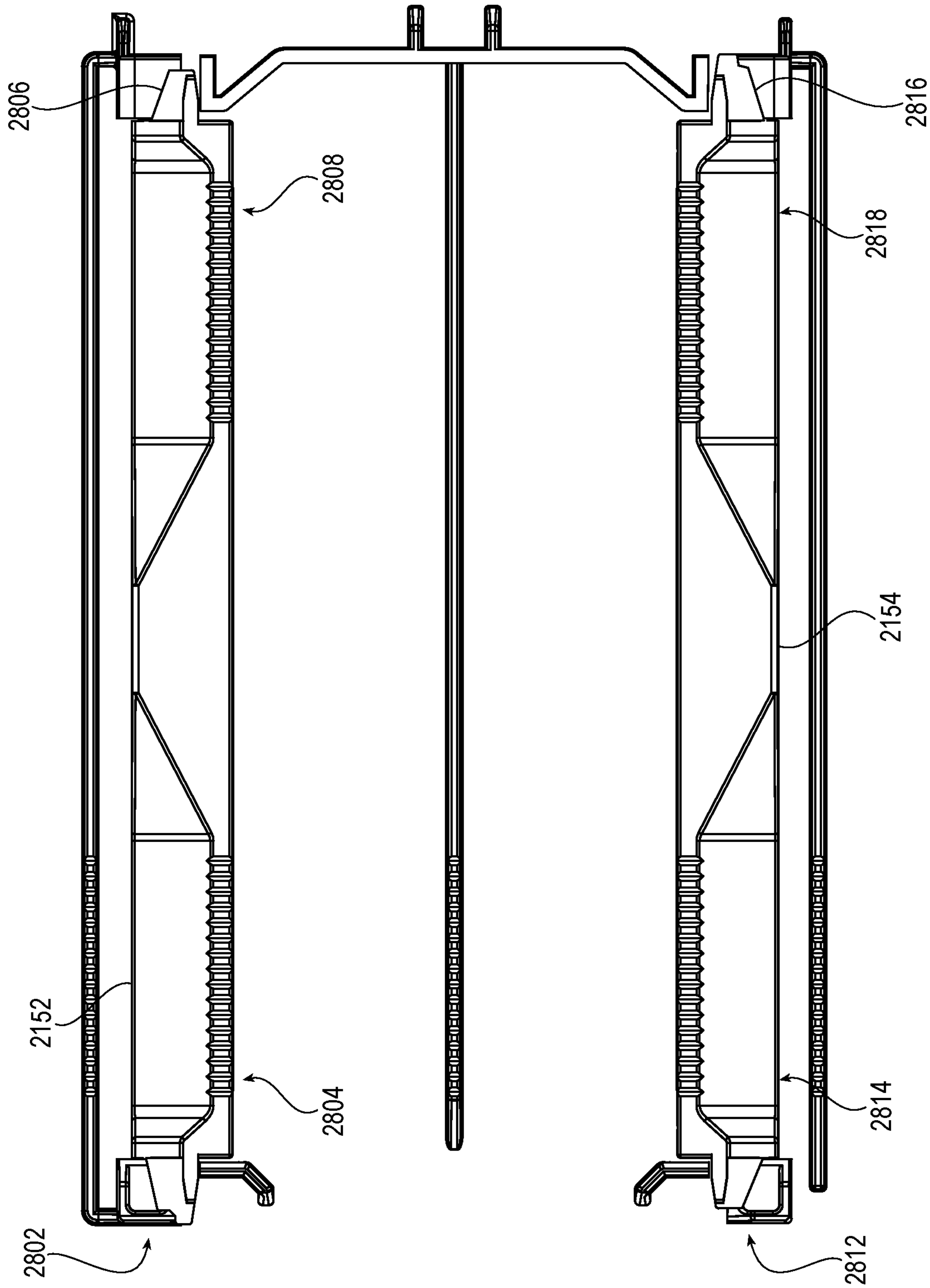
FIG. 29 illustrates an example of a top view of the rails in the second compartment.

FIG. 28 illustrates an example of the second (lower) bracket 2158 in the second compartment 2108 with rails 2152, 2154 attached. The second bracket 2158 comprises a plurality of pockets 2702 on each side 2704, 2706 of the bracket 2158 that correspond to the plurality of pockets 602 of the first bracket 2156. The distance between rails 2152, 2154 can be adjusted by moving the rails 2152, 2154 to selected pockets of the plurality of pockets 2602, 2702. This can allow the second compartment 2108 to be configured to hold sheets of various sizes. In an example embodiment, the plurality of pockets 2702 at the first end 2704 of bracket 2158 are configured differently than the plurality of pockets 2702 at the second side 2706 of the bracket 2158 that ensures brackets 2152, 2154 engage bracket 2158 in a third and fourth predetermined positions respectively.

FIG. 28 illustrates an example of a top view of the rails 2152, 2154 in the second compartment. 2108 Rail 2152 comprises a first protrusion 2802 at a first end 2804 and a second protrusion 2806 at a second end 2808. In an example embodiment, the first protrusion 2802 and second protrusion 2806 have different configurations to ensure they are installed correctly.

Rail 2154 comprises a first protrusion 2812 at a first end 2814 and a second protrusion 2816 at a second end 2818. In an example embodiment, the first protrusion 8212 and second protrusion 8216 have different configurations to ensure they are installed correctly. In an example embodiment, the lengths of rails 2152, 2154 are different to further ensure that rails 2152, 2154 are installed in the third and fourth predetermined positions respectively.

Figure 30:
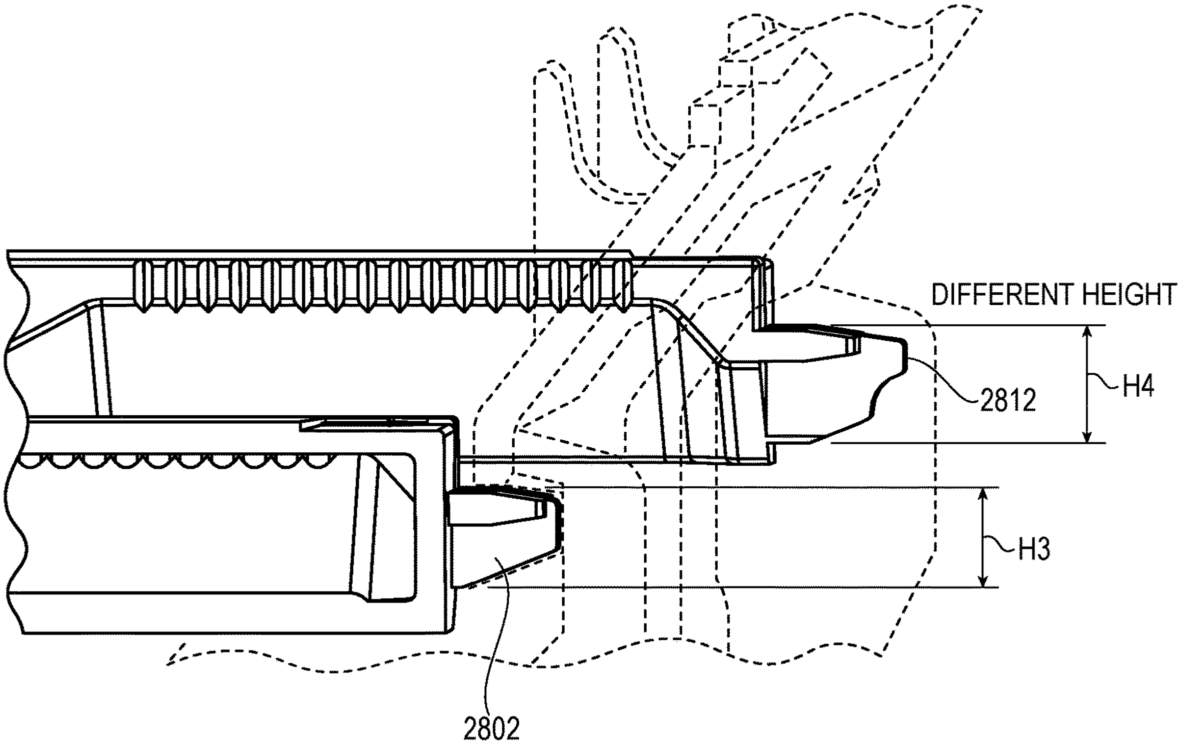
FIG. 30 illustrates an example of an exploded view of the first ends of the second compartment first and second rails that shows the differences in configuration of the second compartment first and second rails at the first end.

FIG. 30 illustrates an example of an exploded view of the first ends 804, 814 of the second compartment first and second rails 2152, 2154 respectively that shows the differences in configuration of the second compartment first and second rails at the first end. The protrusion 802 of the second compartment first rail 2152 is a first height H3 than is different than the height H4 of the protrusion 812 of the second compartment second rally 2154. This can prevent the rails 2152, 2154 from being installed on the wrong sides of compartment 2108.

Figure 31:
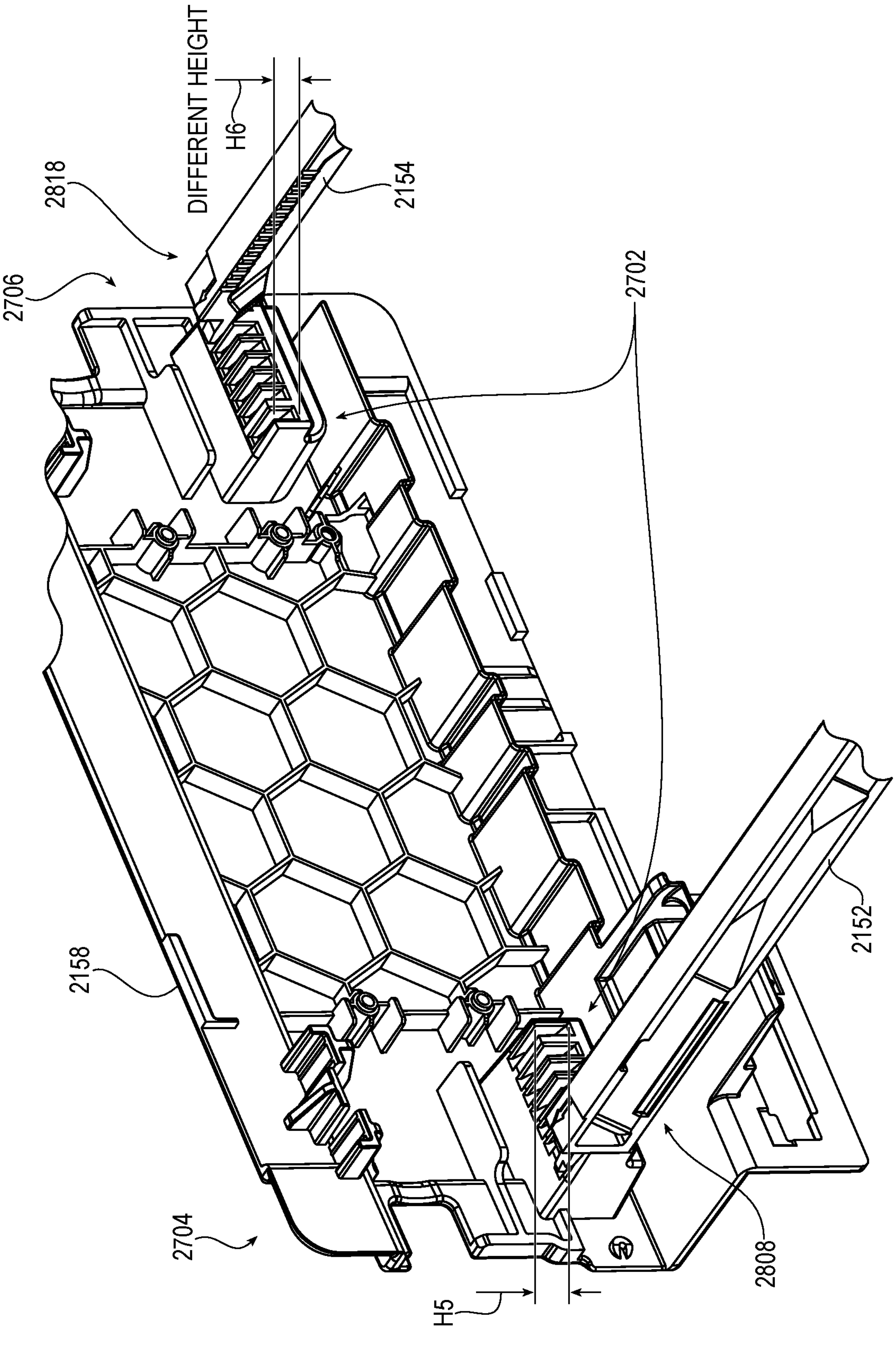
FIG. 31 illustrates an example of an exploded view of the second end of the second compartment first and second rails that shows the differences in the configurations of the second compartment first and second rails at the second end.

FIG. 31 illustrates an example of an exploded view of the second ends 2808, 2818 of the second compartment first and second rails 2152, 2154 that shows the differences in the configurations of the second compartment first and second rails 2152, 2154 engaging the second bracket 2158. In the illustrated example, the height H5 of the first end 2704 of bracket 2158 is different of the height H6 of the second side 706 of the second bracket 2158. This can further ensure that rails 2152, 2154 are installed correctly into the third and fourth predetermined positions. In particular embodiments, H3, H4, H5, and H6 are all configure differently.

Figure 32:
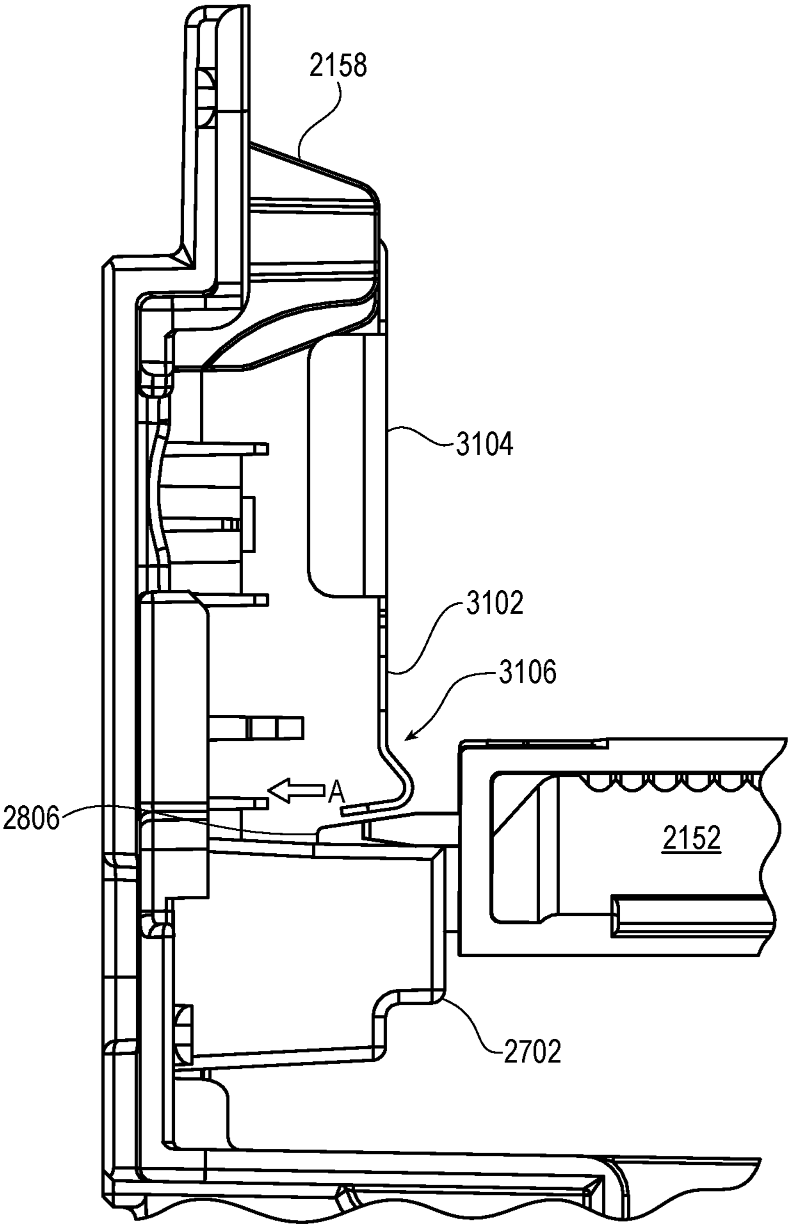
FIG. 32 is a side view of the second bracket for illustrating an example of how a rail can be installed or removed.

FIG. 32 is a side view of the second bracket 2158 for illustrating an example of how rails 2152, 2154 can be installed or removed. In the illustrated example, a sheet metal spring 3102 is coupled with bracket 3104 and is operable to move in direction indicated by arrow A when a force is applied to the bottom 3106 of the sheet metal spring 3102. Once the bottom 3106 of the sheet metal spring 3102 is moved out of the way the rail 152 can be installed or removed from a selected pocket from the plurality of pockets 2702. Rail 2154 is configured to couple with bracket 2158 in a similar manner.

Figure 33:
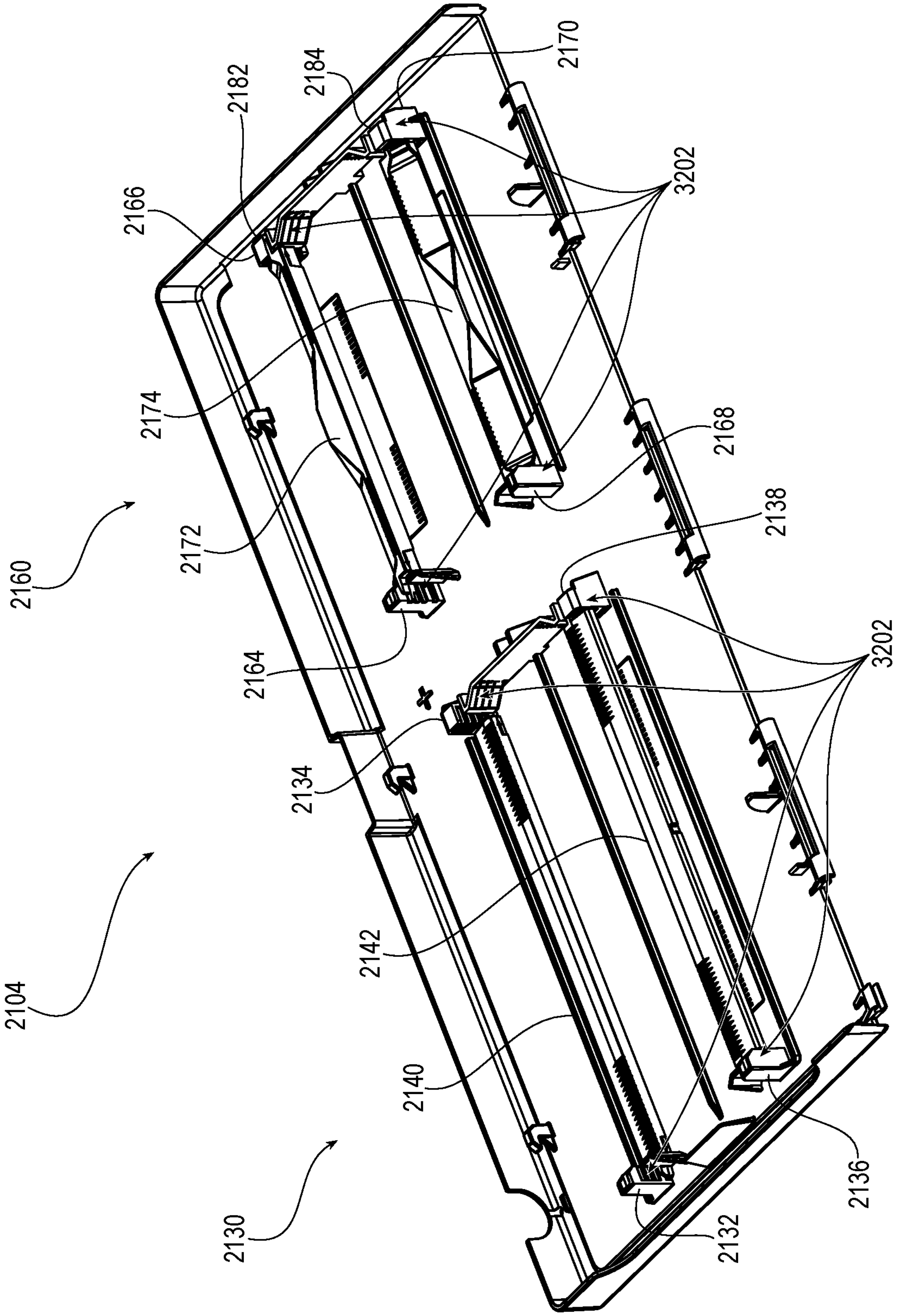
FIG. 33 is a perspective view of the front door of a cassette.

FIG. 33 is a perspective view of the front door 2104 of the cassette 2100. FIG. 32 illustrates that height adjustment brackets 2132, 2134, 2136, 2138, 2154, 2156, 2164, 2166, 2168, 2170 have a plurality of pockets 3202. The plurality of pockets 3202 can allow adjustment of the height of rails 2140, 2142, 2172,2174.

Figure 34:
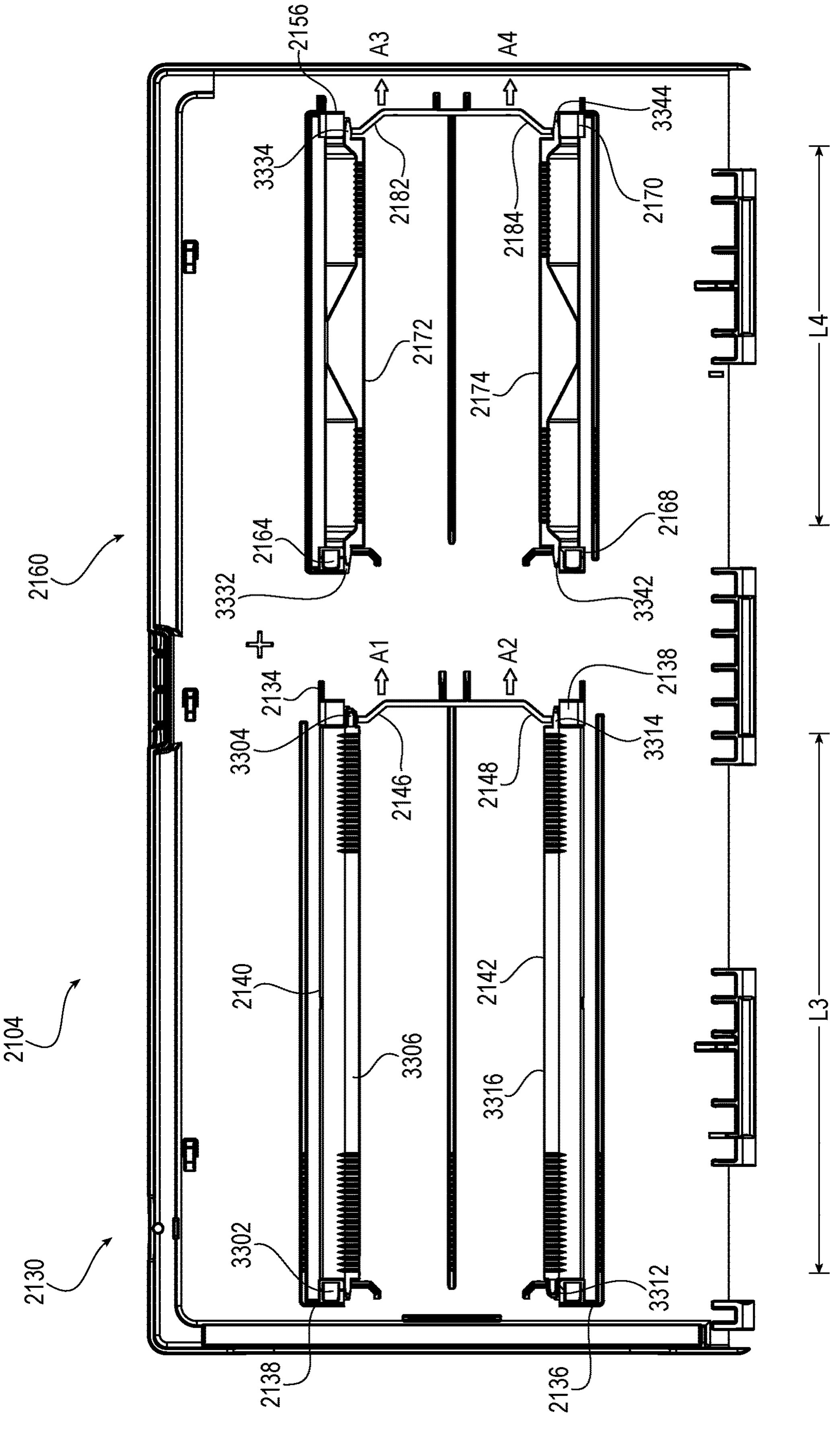
FIG. 34 is a top view of the front door of a cassette.

FIG. 34 is a top view of the front door 2104 of the cassette 2100. Rails 2140, 2142 have a first length L3 that is different than the length L4 of rails 2172, 2174. This can prevent the rails from being inadvertently installed in the wrong assembly 2130, 2160.

The protrusions 3302, 3304 at the ends of the rail 2140 are configured differently than the protrusions 3312, 3314 at the ends of the rail 2142. In an example embodiment, rails 2140, 2141 are the same but rotated 180 degrees. In an example embodiment, the protrusions 3302, 3304 are located on a side 3306 of the rail 2140 and the protrusions 3312, 3314 are offset from the side 3316 to ensure rails 2140, 2142 are installed in the fifth and sixth predetermined positions respectively. In an example embodiment, to remove or install rail 2140, the first rail release lever 2146 is moved in direction A1. To remove or install rail 2142, plastic rail release lever 2148 is moved in direction A2.

The protrusions 3332, 3304 at the ends of the rail 2172 are configured differently than the protrusions 3342, 3344 at the ends of the rail 2174. In an example embodiment, rails 2172, 2174 are the same rail but rotated 180 degrees In an example embodiment, the ends 3302, 3304 are located in the middle of the rail 2172 and the protrusions 3342, 3344 are at a side 3346 of rail 2174 to ensure rails 2172, 2174 are installed in the seventh and eighth predetermined positions respectively. In an example embodiment, to remove or install rail 2172 the plastic rail release lever 2182 is moved in direction A3. To remove or install rail 2174, the plastic lever 2184 is moved in direction A4.

Those skilled in the art can readily appreciate the cassette illustrated herein can further comprise other components for transporting sheets to or from the cassette, such as, for example, motors, push plates, feed wheels, stripper wheels, and pathways. These components are not shown for ease of illustration and the example embodiments described herein should not be construed as excluding any additional components. In an example embodiment, rails 2122, 2124, 2140, 2142, 2152, 2154, 2170, 2172 are shaped differently to ensure they are installed in their correct positions. The shape differences may include different lengths, and different configurations at the ends of the rails, such as for example, the height of tabs and/or the location of protrusions at the end of the rail configured to engage the appropriate bracket.

Figure 35:
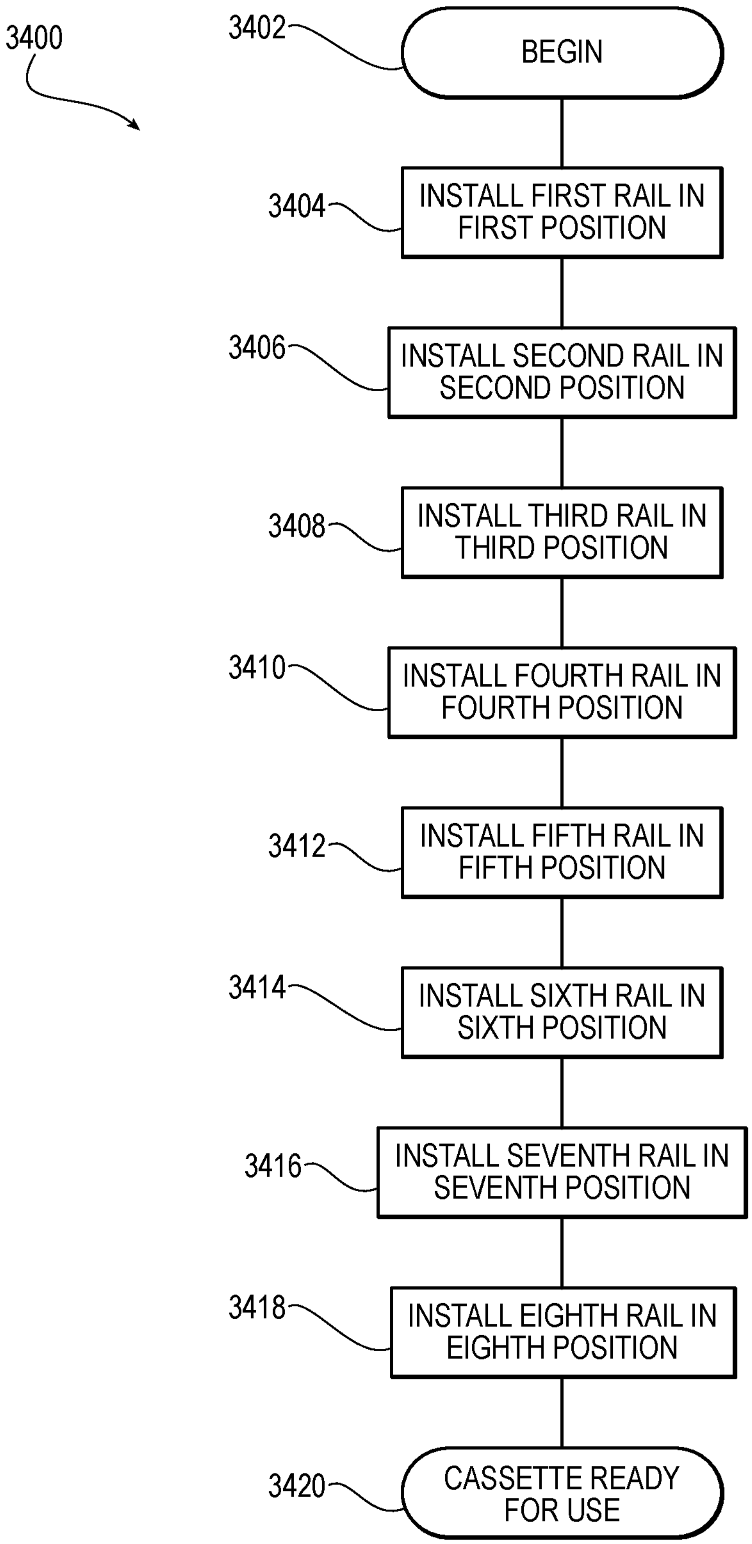
FIG. 35 illustrates an example methodology for installing rails in a dual cassette configured in accordance with an example embodiment.

In view of the foregoing structural and functional features described above, a methodology 3400 in accordance with an example embodiment will be better appreciated with reference to FIG. 35. While, for purposes of simplicity of explanation, the methodology of FIG. 35 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required in accordance with an aspect of an example embodiment.

The methodology 3400 begins at 3402. Referring to FIGS. 22-34, for example, the front door 2104 can be opened or the various rails 2122, 2124, 2140, 2142, 2152, 2154, 2172 and 2174 are acquired. In an example embodiment, each of rails 2122, 2124, 2140, 2142, 2152, 2154, 2172 and 2174 have a different configuration. For example, some rails can have different lengths. As another example, some rails can have different protrusions at their ends, thereby ensuring that the rails 2122, 2124, 2140, 2142, 2152, 2154, 2172 and 2174 are installed in the correct location and position.

At 3404, the first rail (or first compartment first rail) 2122 is installed in the first predetermined position in the first compartment 2106 of the cassette 100. Protrusions 2404, 2410 are inserted into pockets selected from the plurality of pockets 2202, 302 for the desired width. In an example embodiment, the first rail 2122 has a plastic snap 406 sized to fit the correct window or cutout 306 in bracket 2128. To remove the rail 2122, a pulling force is applied to the plastic snap 2406 to pull the plastic snap 2306 away from the bracket 2128.

At 3406, the second rail (or first compartment second rail) 2124 is installed in the second predetermined position in the first compartment 2106 of the cassette 2100. Protrusions 2504, 2510 are inserted into pockets selected from the plurality of pockets 2202, 2302 for the desired width. In an example embodiment, the second rail 2124 has a plastic snap 2506 sized to fit the correct window or cutout 2310 in bracket 2128. To remove the rail 2124, a pulling force is applied to the plastic snap 2506 to pull the plastic snap 2506 away from the bracket 2128.

At 3408, a third rail (or first front door rails) 2140 is installed into a third predetermined position within bracket assembly 2130 on the front door 2104. The third rail 2140 is installed in selected pockets from the plurality of pockets 3202 in the first height adjustment bracket 2132 and the second height adjustment bracket 2134 to achieve a desired height. In an example embodiment, rail release lever 2146 is moved in direction A1 to install rail 2140. Rail release lever 2146 is also moved in direction A1 to remove rail 2140.

At 3410, a fourth rail (or second front door rails) 2142 is installed into a fourth predetermined position within bracket assembly 2130 on the front door 2104. The fourth rail 2142 is installed in selected pockets from the plurality of pockets 3202 in the third height adjustment bracket 2136 and the fourth height adjustment bracket 2138 to achieve a desired height. In an example embodiment, rail release lever 2148 is moved in direction A2 to install rail 2140. Rail release lever 2148 is also moved in direction A1 to remove rail 2140.

At 3412, the fifth rail (or second compartment first rail) 2152 is installed in the fifth predetermined position in the second compartment 2108 of the cassette 2100. Protrusions 2802, 2806 are inserted into pockets selected from the plurality of pockets 2602, 2702 for the desired width. In an example embodiment, the protrusions 2802, 2806 the fifth rail 2152 are sized to fit the correct pockets 2602, 2702 in brackets 2156, 2158. The protrusions 2802, 2806 are configured to ensure that rail 2152 is installed correctly in the fifth predetermined position. In an example embodiment, a force is applied to the bottom 3106 of sheet metal spring 3102 to move the bottom 3106 of sheet metal spring 3102 in direction A and allow rail 2152 to be installed. Similarly, to remove the fifth rail 2152, a force is applied to the bottom 3106 of sheet metal spring 3102 to move the bottom 3106 of sheet metal spring 3102 in direction A until clear of protrusion 2806.

At 3414, the sixth rail (or second compartment second rail) 2154 is installed in the sixth predetermined position in the second compartment 2108 of the cassette 2100. Protrusions 2812, 2816 are inserted into pockets selected from the plurality of pockets 2602, 2702 for the desired width. In an example embodiment, the protrusions 2812, 2816 the sixth rail 2154 are sized to fit the correct pockets 2602, 2702 in brackets 2156, 2158. The protrusions 2812, 2816 are configured to ensure that rail 2154 is installed correctly in the sixth predetermined position. In an example embodiment, a force is applied to the bottom 3106 of sheet metal spring 3102 to move the bottom 3106 of sheet metal spring 3102 in direction A and allow rail 2154 to be installed. Similarly, to remove the sixth rail 2154, a force is applied to the bottom 3106 of sheet metal spring 3102 to move the bottom 3106 of sheet metal spring 3102 in direction A until clear of protrusion 2806.

At 3416, a seventh rail (or third front door rail) 2172 is installed into a seventh predetermined position within bracket assembly 2160 on the front door 2104. The seventh rail 2172 is installed in selected pockets from the plurality of pockets 1202 in the fifth height adjustment bracket 164 and the sixth height adjustment bracket 166 to achieve a desired height. In an example embodiment, rail release lever 2182 is moved in direction A3 to install rail 2172. Rail release lever 2182 is also moved in direction A3 to remove rail 2172.

At 3418, am eighth rail (or third front door rail) 2174 is installed into an eighth predetermined position within bracket assembly 2160 on the front door 2104. The eighth rail 2174 is installed in selected pockets from the plurality of pockets 3202 in the seventh height adjustment bracket 2168 and the eighth height adjustment bracket 2170 to achieve a desired height. In an example embodiment, rail release lever 2184 is moved in direction A4 to install rail 2174. Rail release lever 2184 is also moved in direction A4 to remove rail 2174.

In an example embodiment, the lengths of rails 2140, 2142 is different from the length of rails 2172, 2174. This can further ensure that the wrong rails are not installed in the wrong place.

At 3420, installation of the rails is complete and the cassette 2100 is ready for use. At this point sheets can be placed into the first and/or second compartments 2106, 2108 and the front door 2104 can be closed, and the cassette 2100 can be put into service.

In an example embodiment, when the front door 2104 is open, rail release levers 2146, 2148, 2182, 2184 can be moved to release rails 2140, 2142, 2182, 2184 respectively and allows them to be removed. In an example embodiment, as will be illustrated in FIGS. 36 and 37, when the front door 2104 is closed secure rail release brackets hold the rail release levers 2146, 2148, 2182, 2184 in place and thus hold the rails 2140, 2142, 2182, 2184 in place while the front door is closed. This can prevent the rails 2140, 2142, 2182, 2184 from moving during a cassette drop.

Figure 36:
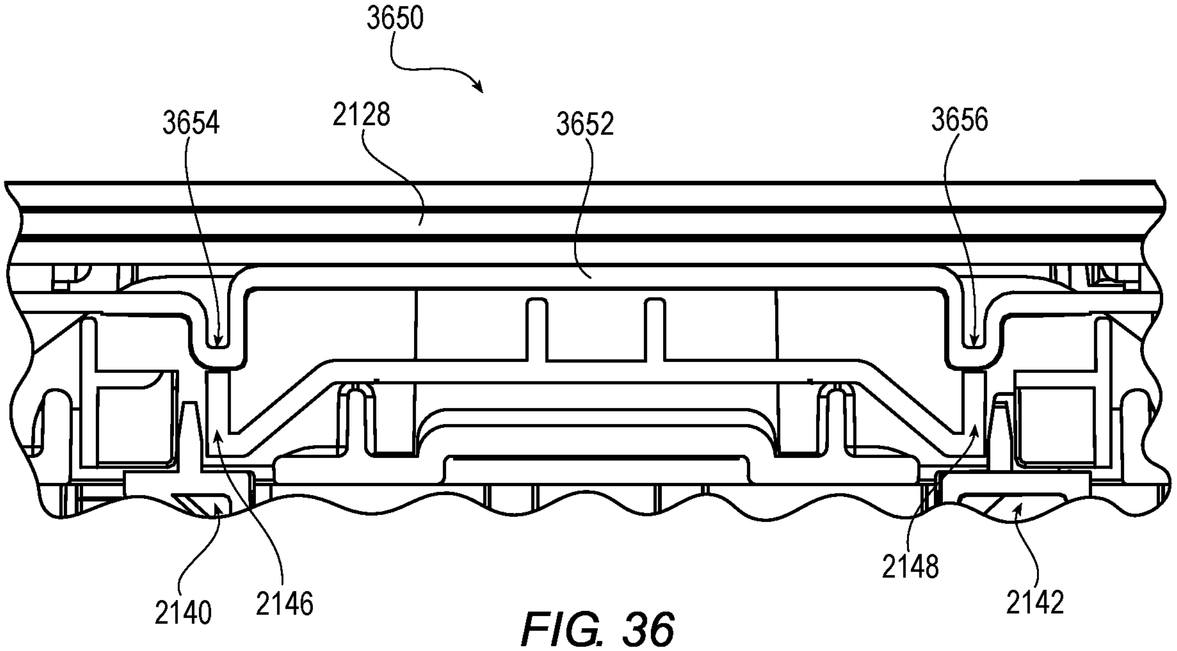
FIG. 36 is a cutaway view of the cassette with the front door closed that illustrates an example of the first compartment with a rail release brace that secures the rail release levers while the front door is closed.

FIG. 36 is a cutaway view 3650 of the cassette 2100 with the front door 2104 closed that illustrates an example of the first compartment 2106 with a rail release brace 3652 that secures the rail release levers 2146, 2148 s while the front door 2104 is closed. Protrusion 3654, 3656 on rail 3652 prevent rail release levers 2146, 2148 respectively in place which locks rails 2140, 2142 respectively in place.

Figure 37:
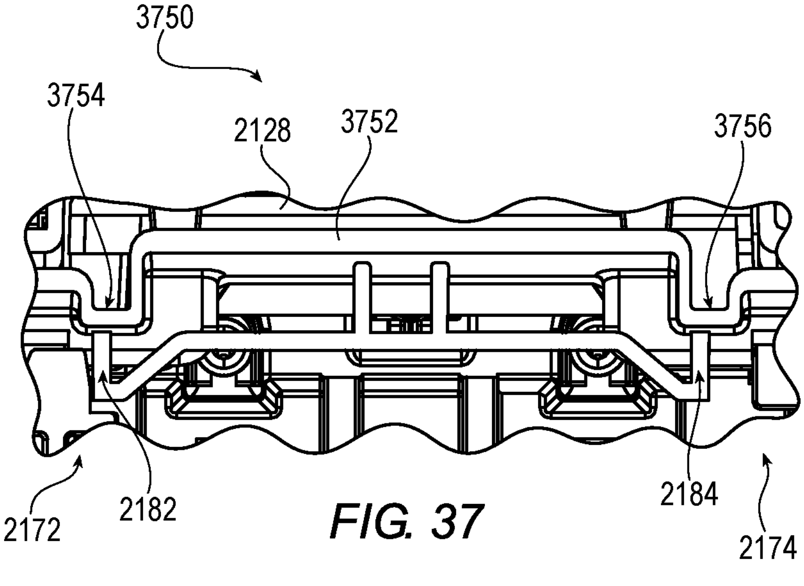
FIG. 37 is a cutaway view of the cassette with the front door closed that illustrates an example of the second compartment with a rail release brace that secures the rail release levers while the front door is closed.

FIG. 37 is a cutaway view 3750 of the cassette 2100 with the front door 2104 closed that illustrates an example of the second compartment 2108 with a rail release brace 3751 that secures the rail release levers 2182, 2184 while the front door 2104 is closed. Protrusion 3754, 3756 on rail 3752 prevent rail release levers 2182, 2184 respectively in place which locks rails 2172, 2174 respectively in place.

FIGS. 38-44 illustrate an example of a cassette with a transport access door. The cassette comprises a front door for accessing the interior compartments where contents, such as sheet (for example currency notes or documents) are stored. The transport path is between the floor and the rear of the cassette and allows access to the transport path without providing access to the interior compartments. This can be useful in allowing a person who is not authorized to access the interior compartments of the cassette to clear paper jams or other faults in the transport path without being able to access the contents stored in the interior compartments of the cassette.

Figure 38:
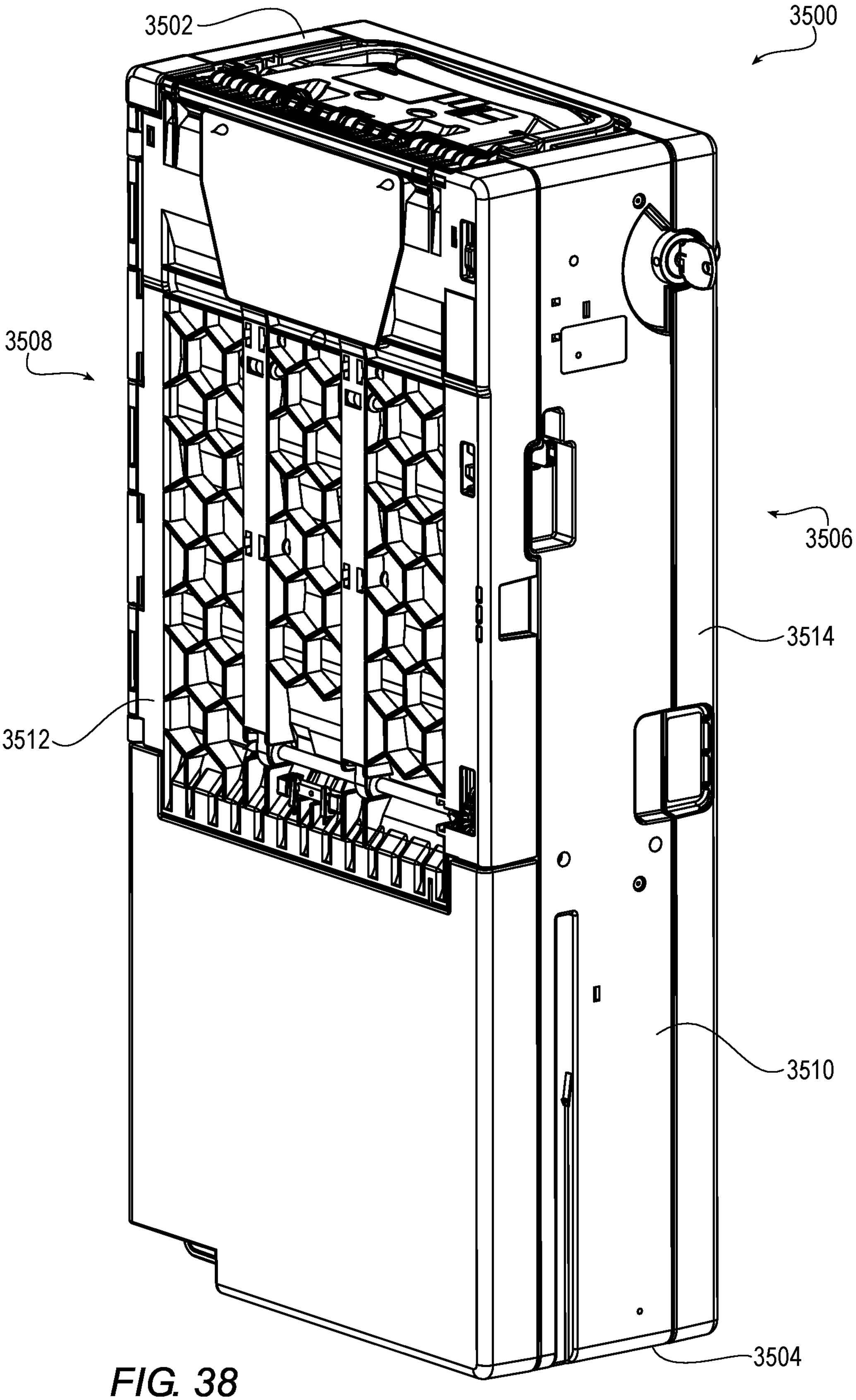
FIG. 38 is a top rear perspective view that illustrates an example of a cassette with a transport access door.

Referring to FIG. 38, there is illustrated a top rear perspective view of a cassette 3500 with a transport access door 3512. The cassette comprises a top side 3502. a bottom side 3504, a front side 3506, a right side 3508, and a left side 3510. As will be described herein, the transport access door 3512 provides access to the internal transport (3706; FIG. 37) of a multi-compartment (for example dual) cassette, but does not allow access into the internal compartments (see e.g., 3602, 3604 ni FIG. 36) of the cassette 3500 where the sheets (e.g., currency notes, documents, etc.) are stored. As will be described herein (see e.g., FIG. 41), the cassette 3500 further comprises a feedwheel lock mechanism that prevents access to the cassette's contents.

Figure 39:
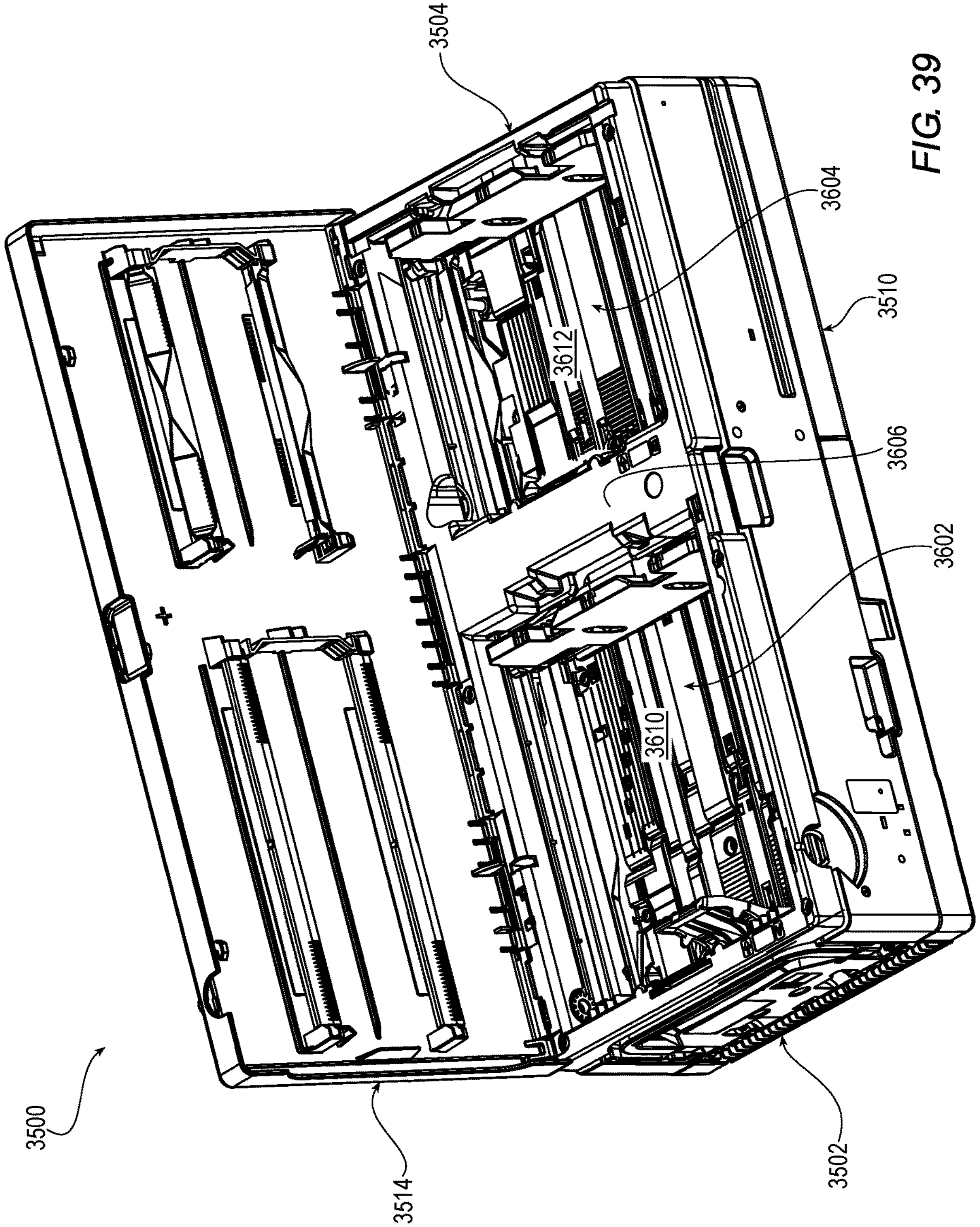
FIG. 39 illustrates an example of the interior compartments of the cassette in FIG. 38 when viewed from the front with the front door open.

FIG. 39 illustrates an example of the interior compartments of the cassette 3500 when viewed from the front side 3506 with the front door 3514 open. The cassette 3500 comprises a first (upper) compartment 3602 and a second (lower) compartment 3604 separated by a divider 3606. The first compartment 3602 comprises a first floor 3610. The second compartment 3604 comprises a second floor 3612. In an example embodiment, the first and second floors are formed on a continuous surface (e.g., the first compartment and the second compartment have the same depth). However, in other example embodiments, the floors 3610, 3612 have different depths.

Figure 40:
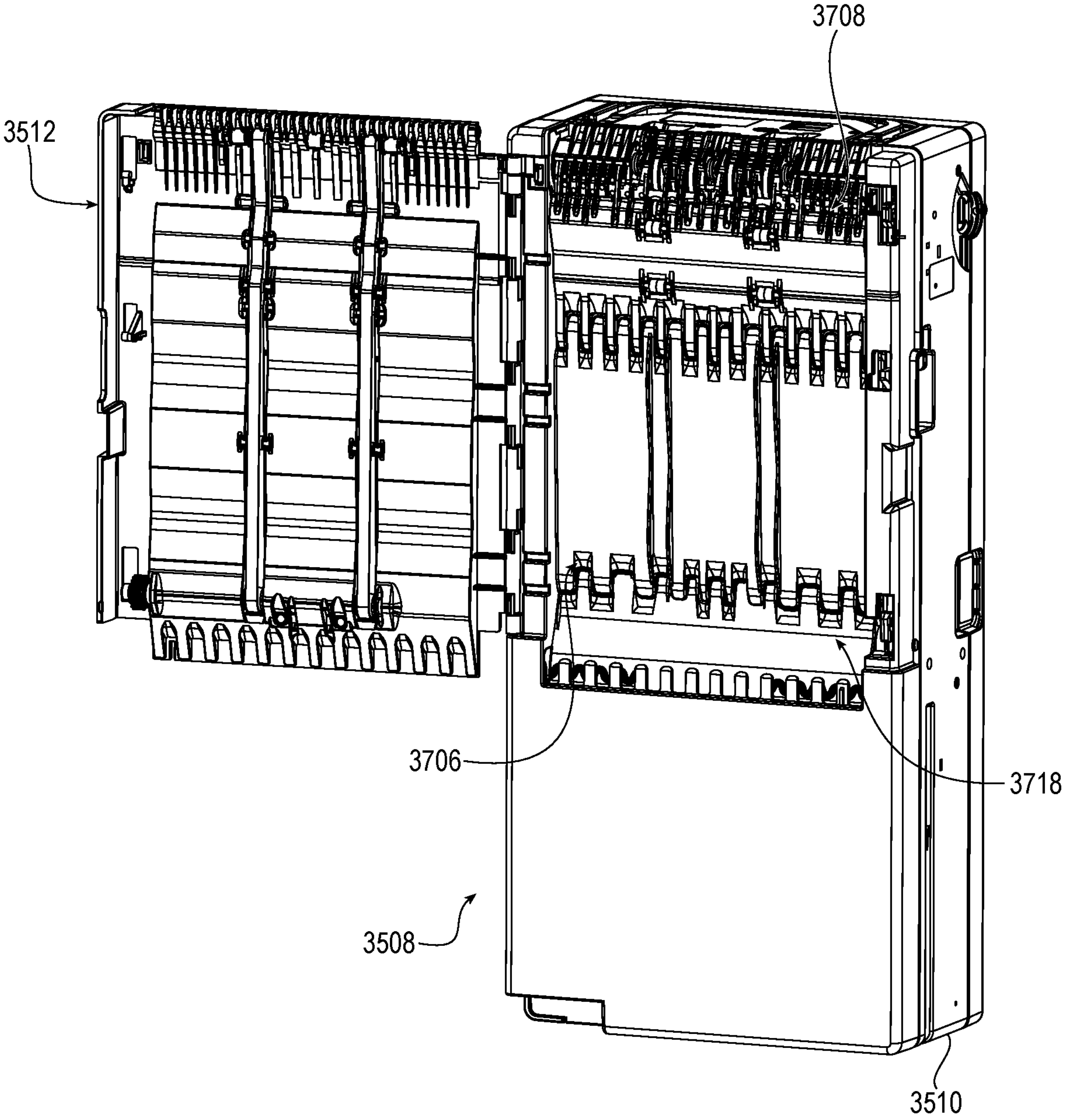
FIG. 40 is a top rear perspective view that illustrates an example of the cassette in FIG. 38 with the transport access door in an open position.

FIG. 40 is a top rear view that illustrates an example of the cassette 3500 in FIG. 35 with the transport access door 3512 in an open position. While the transport access door 3512 is in the open position, the internal transport 3706, which is between the rear surface 3508 and the first and second floors 3610, 3612 can be accessed. The area of the internal transport 3706 that can be accessed includes the entry/exit slot of the upper bin 3708 and the entry/exit slot of the lower bin 3710. This can allow for clearing of paper jams or repair of other problems in the internal transport 3706 between the entry/exit slot of the upper bin 3708 and the entry/exit slot of the lower bin 3710.

Figure 41:
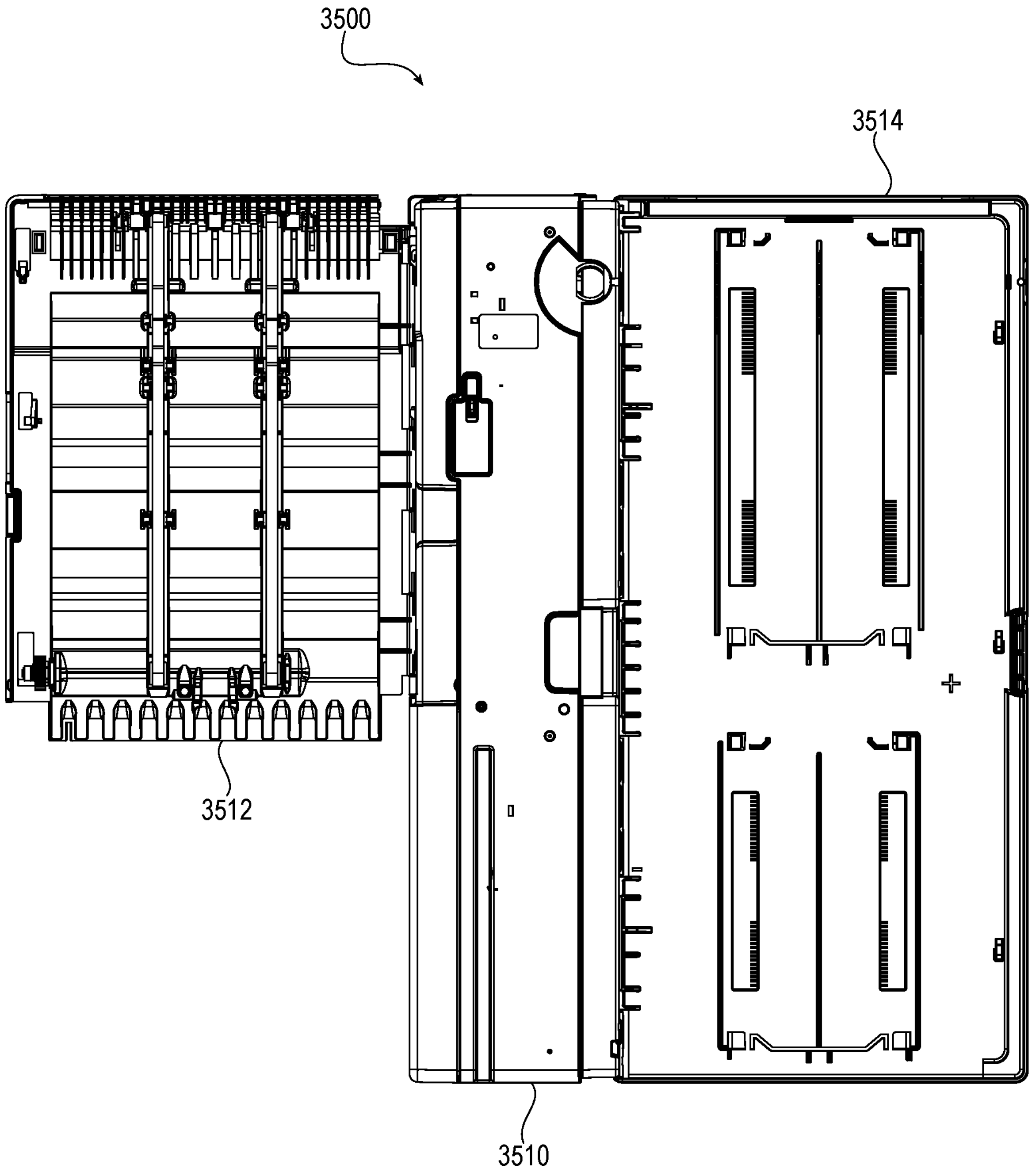
FIG. 41 is a left side view of the cassette in FIG. 38 that illustrates an example of the front door and transport access door in an open position.

FIG. 41 is a left side view of the cassette 3500 that illustrates an example of the front door 3514 and transport access door 3512 in an open position. The transport access door 3512 and front door 3514 can be operated (opened/closed/locked) independently.

Figure 42:
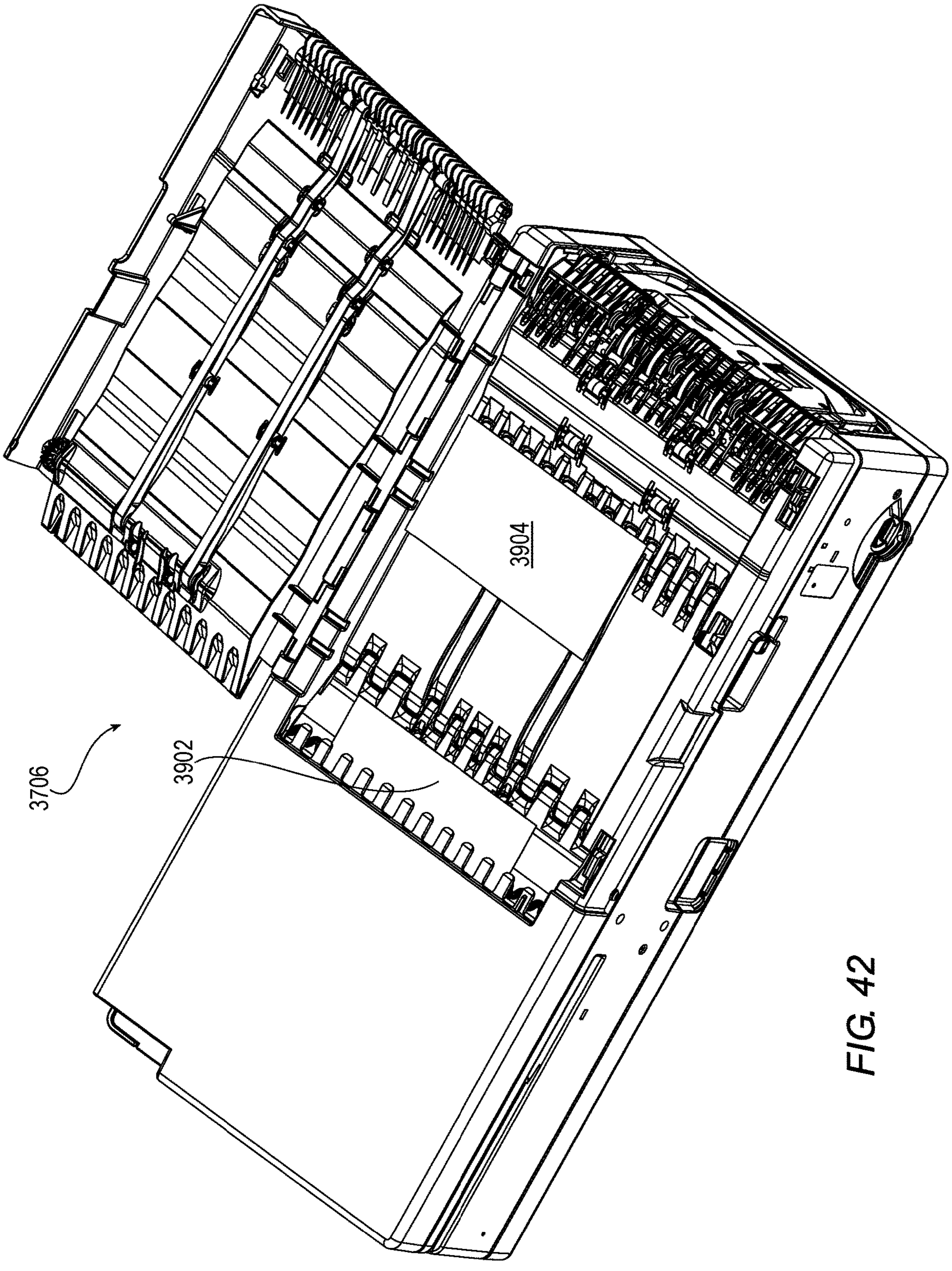
FIG. 42 illustrates an example of the cassette in FIG. 38 with the transport access door in an open position and sheets on the internal transport.

FIG. 42 illustrates an example of the cassette 3500 with the transport access door 3512 in an open position with sheets 3902, 3904 on the internal transport 3706. As those skilled in the art can readily appreciate, it sheet 3902 and/or 3904 is stuck or jammed, a user can remove one or both of them.

Figure 43:
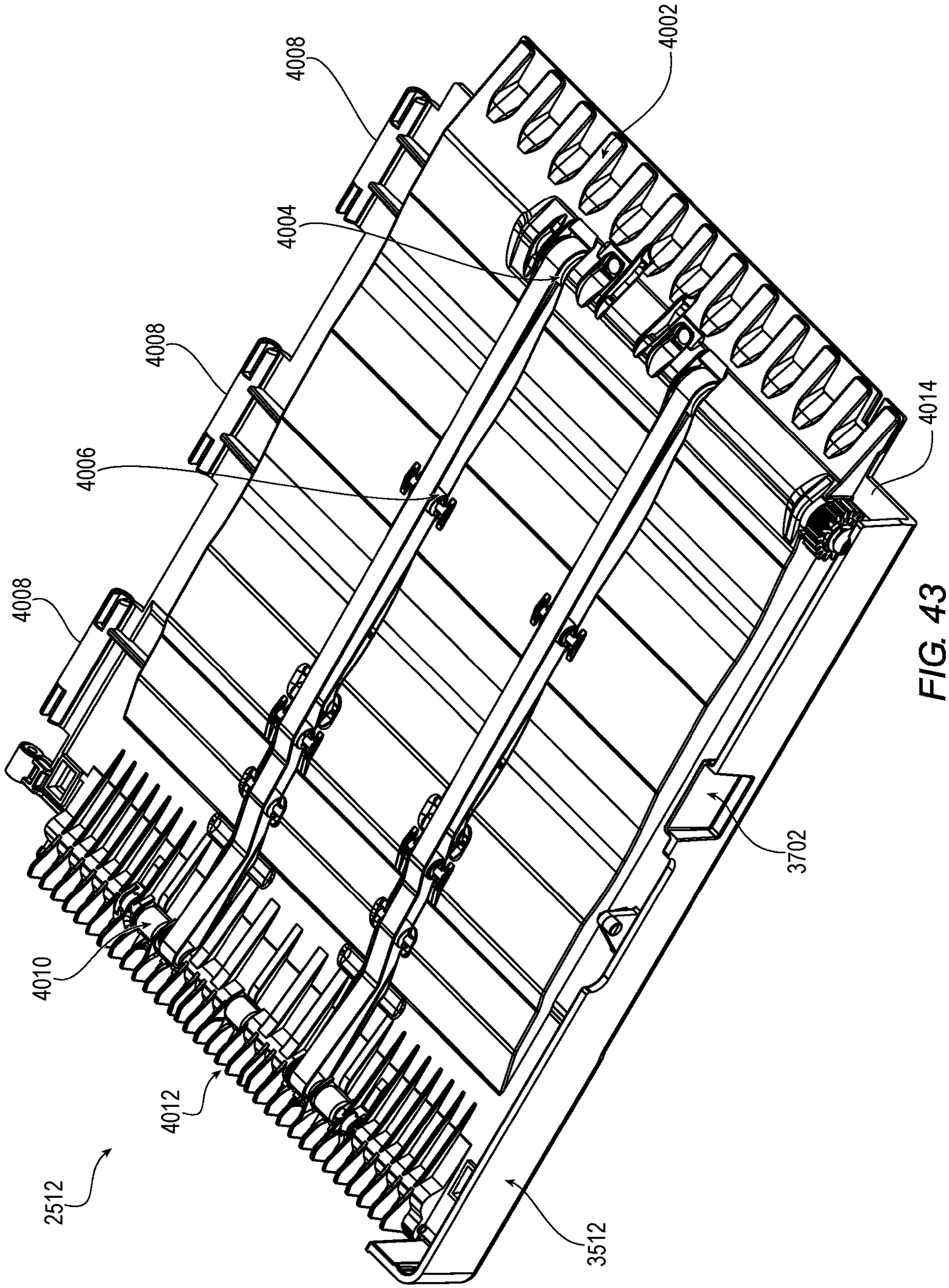
FIG. 43 is a perspective view illustrating an example of a transport access door for the cassette illustrated in FIG. 38.

FIG. 43 is a perspective view illustrating an example of a transport access door 2512. The transport access door comprises a section 4012 that corresponds to the lower BIN entry/exit 3710, a transport drive shaft 4004, a support roller 4006, hinges 4008 for coupling the transport access door 2512 to the cassette 3500, a transport turn shaft, and an upper section 4016 that corresponds to the cassette entry/exit slot. When the transport access door 2512 is closed, gear 4014 is coupled with a motor/drive train within the cassette that provides power to the transport drive shaft 4004.

Figure 44:
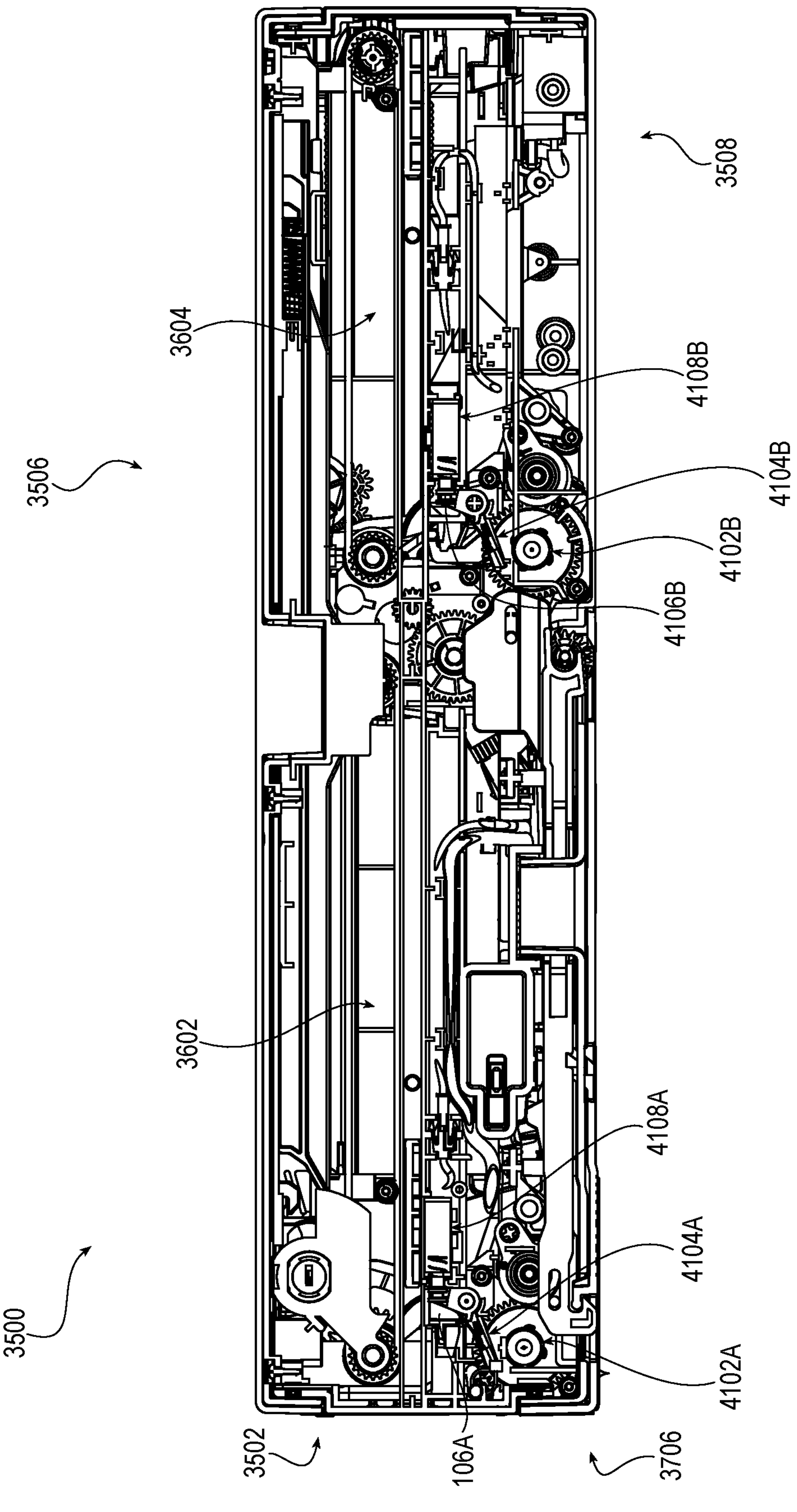
FIG. 44 is an internal view of a cassette that illustrates an example a feedwheel locking system.

FIG. 44 is an internal view of a cassette 4100 that illustrates an example a feedwheel locking system. The feedwheel locking system described herein can be employed with the cassette 3500 described in FIGS. 35-40 or in other multi-compartment cassettes.

The first (upper) compartment 3602 comprises a feedwheel gear 4102A. A first locking lever 4104A is coupled with a first feedwheel gear 4102A. A first spring 4106A biases the first locking lever 4104 to lock the first feedwheel gear 4102A. A first solenoid 4108A is also coupled with the first locking lever 4104A. When energized, the first solenoid 4108A holds the first locking lever 4104A in an unlocked position. If the cassette loses power (or in the case of a cassette with a battery, the cassette loses external power), the first solenoid 4108A becomes de-energized and the first spring 4106A causes the first locking lever 4104A to return to the locked position to lock the first feedwheel 4104A. As those skilled in the art can readily appreciate, locking the first feedwheel prevents someone with access to internal transport 3706 from gaining access to the contents of the first compartment 3602 by turning the first feedwheel 3702A because the first feedwheel 4102A is locked.

In an example embodiment, first (lower) compartment 3602 comprises a feedwheel gear 4102B. A first locking lever 4104B is coupled with a first feedwheel gear 4102B. A first spring 4106B biases the first locking lever 4104 to lock the first feedwheel gear 4102B. A first solenoid 4108B is also coupled with the first locking lever 4104B. When energized, the first solenoid 4108B holds the first locking lever 41046 in an unlocked position. If the cassette loses power (or in the case of a cassette with a battery, the cassette loses external power), the first solenoid 4108B becomes de-energized and the first spring 41066 causes the first locking lever 41046 to return to the locked position to lock the first feedwheel 4104B. As those skilled in the art can readily appreciate, locking the first feedwheel prevents someone with access to internal transport 3706 from gaining access to the contents of the first compartment 3602 by turning the first feedwheel 3702A because the first feedwheel 41026 is locked.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:

a stop;

a push plate catch and release mechanism, the push plate catch and release mechanism comprises a first gear and a second gear, the first gear comprises a top surface that comprises a release extending from the top surface, the second gear comprises a surface extending from a bottom surface of the second gear that abuts the top surface of the first gear and an arm extending from a body of the second gear, the arm comprises a catch on a side of the arm;

wherein, when rotation in a first direction is caused by a force exerted on the first gear, movement of the first gear causes the release to be positioned to guide the stop around the catch; and wherein when rotation in the first direction is caused by a force exerted on the second gear, movement of the second gear causes the release to move under the arm of the second gear allowing the stop to engage the catch;

a cassette having a body that comprises a bottom surface, left surface, right surface, top surface, and rear surface;

a front door configured to engage the bottom surface, the left surface, the right surface, and the top surface while in a closed position;

a first compartment located within the body;

a first compartment first rail having a first shape located within the first compartment;

a first compartment second rail having a second shape located within the first compartment;

a first compartment upper bracket located within the first compartment; and a first compartment lower bracket located within the first compartment;

the front door comprises a first front door bracket assembly positioned to fit within the first compartment while the front door is in a closed position, the first front door bracket assembly comprising a first front door height adjustment bracket, a second front door height adjustment bracket, a third front door height adjustment bracket, a fourth front door height adjustment bracket, a first front door rail having a third shape configured to engage the first front door height adjustment bracket and the second front door height adjustment bracket in a first predefined height position, a second front door rail having a fourth shape configured to engage the third height adjustment bracket and fourth height adjustment bracket in a second predefined height position and a first rail release lever having first and second sides, the first side of the first rail release lever configured to bias the first front door rail against the second front door height adjustment bracket, and the second side of the first rail release lever is configured to bias the second front door rail against the fourth height adjustment bracket;

wherein the first compartment first rail, the first compartment second rail, the first compartment first bracket and the first compartment second bracket are configured to ensure that the first compartment first rail and the first compartment second rail engage the first compartment upper bracket and the first compartment lower bracket in a first predefined position and a second predefined position respectively;

wherein the first compartment upper bracket and first compartment lower bracket further comprise a plurality of pockets to adjust the first predefined position and second predefined position respectively;

wherein the first front door height adjustment bracket, second front door height adjustment bracket, third front door height adjustment bracket, and fourth front door height adjustment bracket comprise a plurality of pockets to adjust the first predefined height position and the second predefined height position respectively; and wherein the push plate catch and release mechanism and stop are located within the first compartment.

2. The apparatus set forth in claim 1, further comprising:

a motor coupled with the first gear of the catch and release mechanism; and a push plate coupled with the second gear of the catch and release mechanism;

wherein movement of the catch and release mechanism in a first direction corresponds to movement of the push plate in a first direction and movement of the catch and release mechanism in a second direction corresponds to movement of the push plate in a second direction.

3. The apparatus set forth in claim 1, further comprising:

a rib located on the front door and positioned to engage the stop when the front door is in a closed position, which causes the rib to engage the stop, causing the stop to engage the catch and release mechanism.

4. The apparatus set forth in claim 3, wherein when the front door is in an open position, the rib is not engaged with the stop and the stop disengages with the catch and release mechanism, allowing the push plate to be manually moved in the first direction and a second direction.

5. The apparatus set forth in claim 1, further comprising a release stop that engages a second raised surface on the bottom surface of the second gear, positioning the release under the arm.

6. The apparatus set forth in claim 1, further comprising:

the top surface of the first gear further comprises a second release; and the body of the second gear further comprises a second catch;

wherein, when rotation in a first direction is caused by a force exerted on the first gear, movement of the first gear causes the second release to be positioned to guide the stop around the second catch; and wherein when rotation in the first direction is caused by a force exerted on the second gear, movement of the second gear causes the second release to move under the second arm of the second gear allowing the stop to engage the catch.

7. The apparatus set forth in claim 1, the arm further comprising a surface that guides the stop around the catch when the stop and release mechanism is rotating in a second direction.

8. An apparatus, comprising:

a stop;

a push plate catch and release mechanism, the push plate catch and release mechanism comprises a first gear and a second gear, the first gear comprises a top surface that comprises a release extending from the top surface, the second gear comprises a surface extending from a bottom surface of the second gear that abuts the top surface of the first gear and an arm extending from a body of the second gear, the arm comprises a catch on a side of the arm;

wherein, when rotation in a first direction is caused by a force exerted on the first gear, movement of the first gear causes the release to be positioned to guide the stop around the catch; and wherein when rotation in the first direction is caused by a force exerted on the second gear, movement of the second gear causes the release to move under the arm of the second gear allowing the stop to engage the catch;

a cassette having a body that comprises a bottom surface, left surface, right surface, top surface, and rear surface;

a front door configured to engage the bottom surface, the left surface, the right surface, and the top surface while in a closed position;

a first compartment located within the body;

a first compartment first rail having a first shape located within the first compartment;

a first compartment second rail having a second shape located within the first compartment;

a first compartment upper bracket located within the first compartment; and a first compartment lower bracket located within the first compartment;

the front door comprises a first front door bracket assembly positioned to fit within the first compartment while the front door is in a closed position, the first front door bracket assembly comprising a first front door height adjustment bracket, a second front door height adjustment bracket, a third front door height adjustment bracket, a fourth front door height adjustment bracket, a first front door rail having a third shape configured to engage the first front door height adjustment bracket and the second front door height adjustment bracket in a first predefined height position, a second front door rail having a fourth shape configured to engage the third height adjustment bracket and fourth height adjustment bracket in a second predefined height position and a first rail release lever having first and second sides, the first side of the first rail release lever configured to bias the first front door rail against the second front door height adjustment bracket, and the second side of the first rail release lever is configured to bias the second front door rail against the fourth height adjustment bracket;

wherein the first compartment first rail, the first compartment second rail, the first compartment first bracket and the first compartment second bracket are configured to ensure that the first compartment first rail and the first compartment second rail engage the first compartment upper bracket and the first compartment lower bracket in a first predefined position and a second predefined position respectively;

wherein the first compartment upper bracket and first compartment lower bracket further comprise a plurality of pockets to adjust the first predefined position and second predefined position respectively;

wherein the first front door height adjustment bracket, second front door height adjustment bracket, third front door height adjustment bracket, and fourth front door height adjustment bracket comprise a plurality of pockets to adjust the first predefined height position and the second predefined height position respectively;

second compartment located within the body;

a second compartment first rail having a fifth shape located within the second compartment;

a second compartment second rail having a sixth shape located within the second compartment;

a second compartment upper bracket located within the second compartment; and a second compartment lower bracket located within the second compartment;

the front door comprises a second front door bracket assembly positioned to fit within the second compartment while the front door is in a closed position, the second front door bracket assembly comprising a fifth front door height adjustment bracket, a sixth front door height adjustment bracket, a seventh front door height adjustment bracket, an eighth front door height adjustment bracket, a third front door rail having a seventh shape and configured to engage the fifth front door height adjustment bracket and the sixth front door height adjustment bracket in a third predefined height position, a fourth front door rail having an eight shape configured to engage the seventh height adjustment bracket and eighth height adjustment bracket in a fourth predefined height position and a second rail release lever having first and second sides, the first side of the second rail release lever configured to bias the third front door rail against the sixth front door adjustment bracket, and the second side of the first rail release lever is configured to bias the fourth front door rail against the eighth height adjustment bracket;

wherein the second compartment first rail, the second compartment second rail, the second compartment first bracket and the second compartment second bracket are configured to ensure that the second compartment first rail and the second compartment second rail engage the second compartment upper bracket and the second compartment lower bracket in a third predefined position and a fourth predefined position respectively;

wherein the second compartment upper bracket and second compartment lower bracket further comprise a plurality of pockets to adjust the third predefined position and fourth predefined position respectively;

wherein the first front door height adjustment bracket, second front door height adjustment bracket, third front door height adjustment bracket, and fourth front door height adjustment bracket comprise a plurality of pockets to adjust the third predefined height position and the fourth predefined height position respectively; and wherein the push plate and stop are located within the second compartment.

9. The apparatus set forth in claim 8, wherein the first shape, second shape, third shape, fourth shape, fifth shape, sixth shape, seventh shape, and eighth shape are unique.

10. An apparatus, comprising:

a stop;

a push plate catch and release mechanism, the push plate catch and release mechanism comprises a first gear and a second gear, the first gear comprises a top surface that comprises a release extending from the top surface, the second gear comprises a surface extending from a bottom surface of the second gear that abuts the top surface of the first gear and an arm extending from a body of the second gear, the arm comprises a catch on a side of the arm;

wherein, when rotation in a first direction is caused by a force exerted on the first gear, movement of the first gear causes the release to be positioned to guide the stop around the catch; and wherein when rotation in the first direction is caused by a force exerted on the second gear, movement of the second gear causes the release to move under the arm of the second gear allowing the stop to engage the catch;

a cassette having a body that comprises a bottom surface, left surface, right surface, top surface, and rear surface;

a first compartment located within the body, the first compartment having a first floor;

a front door that provides access to the first compartment and a second compartment;

the second compartment is located within the body, the second compartment having a second floor;

an internal transport located between the rear surface of the cassette and the first and second floors; and a transport access door located at the rear surface that provides access to the internal transport;

wherein the push plate catch and release mechanism and stop are located within the second compartment.

11. The apparatus set forth in claim 10, further comprising:

a first compartment feedwheel gear;

a first compartment locking lever;

a first spring that biases the first compartment locking lever to lock the first compartment feedwheel; and a first compartment solenoid;

wherein the first compartment solenoid holds the first compartment locking lever in an unlocked position while the solenoid is energized.

12. The apparatus set forth in claim 11, further comprising:

a second compartment feedwheel gear;

a second compartment locking lever;

a second spring that biases the second compartment locking lever to lock the second compartment feedwheel; and a second compartment solenoid;

wherein the second compartment solenoid holds the second compartment locking lever in an unlocked position while the solenoid is energized.

13. An apparatus, comprising:

a cassette having a body that comprises a bottom surface, left surface, right surface, top surface, and rear surface;

a first compartment located within the body, the first compartment having a first floor;

a front door that provides access to the first compartment and a second compartment;

the second compartment is located within the body, the second compartment having a second floor;

an internal transport located between the rear surface of the cassette and the first and second floors;

a transport access door located at the rear surface that provides access to the internal transport;

a first compartment feedwheel gear;

a first compartment locking lever;

a first spring that biases the first compartment locking lever to lock the first compartment feedwheel; and a first compartment solenoid;

wherein the first compartment solenoid holds the first compartment locking lever in an unlocked position while the solenoid is energized.

14. The apparatus set forth in claim 13, further comprising:

a second compartment feedwheel gear;

a second compartment locking lever;

a second spring that biases the second compartment locking lever to lock the second compartment feedwheel; and a second compartment solenoid;

wherein the second compartment solenoid holds the second compartment locking lever in an unlocked position while the solenoid is energized.

* * * * *